(12) United States Patent
Lim et al.

(10) Patent No.: US 12,363,254 B2
(45) Date of Patent: Jul. 15, 2025

(54) METHOD OF PROVIDING SYNTHETIC VIDEO BASED ON EXERCISE VIDEO

(71) Applicant: Joseph Lim, Gyeonggi-do (KR)

(72) Inventors: Joseph Lim, Gyeonggi-do (KR); Jae Whoon Cho, Gyeonggi-do (KR)

(73) Assignee: Joseph Lim, Gyeonggi-do (KR)

( * ) Notice: Subject to any disclaimer, the term of this patent is extended or adjusted under 35 U.S.C. 154(b) by 235 days.

(21) Appl. No.: 18/237,408

(22) Filed: Aug. 24, 2023

(65) Prior Publication Data
US 2024/0073354 A1 Feb. 29, 2024

(30) Foreign Application Priority Data
Aug. 26, 2022 (KR) .................. 10-2022-0107791

(51) Int. Cl.
*G06T 11/60* (2006.01)
*A63B 24/00* (2006.01)
(Continued)

(52) U.S. Cl.
CPC ......... *H04N 5/272* (2013.01); *A63B 24/0062* (2013.01); *A63B 71/0622* (2013.01); *B64U 10/14* (2023.01); *G06T 7/20* (2013.01); *G06T 7/70* (2017.01); *G06T 7/90* (2017.01); *G06T 11/60* (2013.01); *A63B 2071/0638* (2013.01);
(Continued)

(58) Field of Classification Search
CPC ............ A63B 24/0062; A63B 2220/05; A63B 2220/806; A63B 2071/0638; B64U 2101/05; B64U 2101/30; G06T 2207/10032; G06T 7/90; G06T 11/60; G06T 2210/62; H04N 5/272
See application file for complete search history.

(56) References Cited

U.S. PATENT DOCUMENTS

| 10,621,709 B1* | 4/2020 | Henry ................ H04N 23/12 |
| 2018/0118337 A1* | 5/2018 | Viel .................. B08B 13/00 |

(Continued)

FOREIGN PATENT DOCUMENTS

| JP | 2018-191965 A | 12/2018 |
| KR | 10-2015-0057697 A | 5/2015 |

(Continued)

OTHER PUBLICATIONS

KIPO, Decision to Grant a Patent, Korean Patent Application No. 10-2022-0107791, Jan. 20, 2023.

*Primary Examiner* — Kee M Tung
*Assistant Examiner* — Thang Gia Huynh
(74) *Attorney, Agent, or Firm* — Nicholas Park

(57) ABSTRACT

According to various embodiments of the present invention, a method for obtaining an exercise video performed in a system for obtaining an exercise video, which includes a user device, a server, and a drone, comprises the steps of: receiving a first value for specifying a flight height of the drone, a second value for specifying a distance between a first sensor of the drone and a first point on a surface of a first athlete, and a third value for specifying an angular displacement of the drone in a direction from the first point toward the first sensor with respect to a front direction of the first athlete; confirming information that the drone is at the same height as the first value; obtaining video data obtained by a measurement value and the first sensor.

5 Claims, 32 Drawing Sheets

(51) Int. Cl.
*A63B 71/06* (2006.01)
*B64U 10/14* (2023.01)
*G06T 7/20* (2017.01)
*G06T 7/70* (2017.01)
*G06T 7/90* (2017.01)
*H04N 5/272* (2006.01)
*B64U 101/05* (2023.01)

(52) U.S. Cl.
CPC ..... *A63B 2220/05* (2013.01); *A63B 2220/806* (2013.01); *A63B 2220/83* (2013.01); *B64U 2101/05* (2023.01); *G06T 2207/10016* (2013.01); *G06T 2207/10032* (2013.01); *G06T 2207/20081* (2013.01); *G06T 2207/30196* (2013.01); *G06T 2207/30221* (2013.01); *G06T 2210/62* (2013.01)

(56) References Cited

U.S. PATENT DOCUMENTS

| | | | |
|---|---|---|---|
| 2018/0374384 A1* | 12/2018 | Thielen | G09B 19/0038 |
| 2020/0338392 A1* | 10/2020 | Thörn | G05D 1/12 |
| 2021/0172975 A1* | 6/2021 | Song | A63B 71/0605 |
| 2022/0288451 A1* | 9/2022 | Hebbale | G06T 7/73 |

FOREIGN PATENT DOCUMENTS

| | | | | |
|---|---|---|---|---|
| KR | 10-2017-0135003 A | | 12/2017 | |
| KR | 10-2000763 B1 | | 7/2019 | |
| KR | 102071532 B1 | * | 1/2020 | ......... A63B 24/0006 |
| KR | 20210128943 A | * | 10/2021 | ............ G06V 20/49 |
| KR | 10-2425255 B1 | | 7/2022 | |

\* cited by examiner

0°　　　　90°　　　　180°　　　　270°

METHOD OF PROVIDING SYNTHETIC VIDEO BASED ON EXERCISE VIDEO

CROSS-REFERENCE TO RELATED APPLICATION

This application claims priority to and the benefit of Korean Patent Application No. 10-2022-0107791 filed in the Korean Intellectual Property Office on Aug. 26, 2022, the entire contents of which are incorporated herein by reference.

BACKGROUND

Technical Field

The present invention relates to a system for obtaining a motion video using a drone and a method for obtaining a motion video in the system. The present invention relates to a method for acquiring exercise data on the basis of an exercise video obtained in an exercise video acquisition system. The present invention relates to a method for providing a synthetic video based on a moving video. According to the present invention, a system for obtaining an exercise video using a drone, a method for obtaining exercise data, and a method for providing a synthetic video can be used for posture improvement and performance improvement, particularly in exercise training.

Related Art

As national income increases, interest in sports and sports continues to increase. There are various sports such as track and field events like running, high jump, and long jump, weight training for increasing muscle mass, and ball game events like soccer and badminton, and these various sports are common in that they help to obtain a correct posture or movement by repeating a specific movement and to apply the obtained posture or movement to a real-life to produce high performance.

Disclosed are various methods for acquiring an exercise video for training a professional athlete or a general person who wants to improve his/her athletic ability. The most basic method is to install a camera in a fixed position and take a picture of exercising within the camera angle. In large-scale international sports competitions or professional leagues, tracks are used to allow professional photographers to take pictures with cameras along moving athletes, or to move cameras along moving athletes. Further, various methods are disclosed for acquiring exercise data during a training process for training a professional athlete or a general public who wants to improve his/her athletic ability. The most traditional way is for an experienced coach during training to observe the athlete's movements and advise what a more desirable attitude is based on his or her experience. When an exercise video is obtained, a method in which an experienced coach monitors the obtained video to analyze and evaluate the motion of the athlete appearing in the video is also used.

SUMMARY

Technical Problem

In a conventional method for acquiring an exercise video, in a method in which a camera is installed at a fixed position and a video of an athlete exercising within a camera angle is captured, since a position of an athlete may be moved while a position of the camera is fixed, it is difficult to record movement of the athlete while the position of the athlete is out of the camera angle, and it is difficult to obtain a video consistently captured at the same angle because an angle between a photographing direction of the camera and a body direction of the athlete may be changed. Even when the camera uses a track to move, it is difficult to consistently obtain a video captured at the same angle unless the athlete moves in a direction parallel to the longitudinal direction of the track. When a professional photographer is used in a conventional method for acquiring an exercise video, high costs may be consumed due to a labor cost problem of the photographer, and it may be difficult to consistently obtain a video captured at the same angle according to the capability of the photographer.

Since the conventional method of acquiring exercise data in a training process depends on observation that occurs with the naked eye of an expert such as a coach, there is a limit to the precision of observation itself, and thus it is difficult to expect an efficient posture improvement in the reality that a minute posture difference affects performance.

An object of the present invention is to provide a system for obtaining an exercise video using a drone and a method for obtaining an exercise video using a drone, a method for providing exercise data based on a sports training video obtained using a drone, and a method for providing a synthetic video based on a sports training video obtained using a drone.

Technical Solution

According to an embodiment of the present invention, the system comprises a user device, a server, and a drone, wherein the user device is configured to: receive, from a user, a first value specifying a flight height of the drone, a second value specifying a distance between a first sensor of the drone and a first point on a surface of a first athlete, and a third value specifying an angular displacement of a direction from the first point toward the first sensor of the drone with respect to a front direction of the first athlete, wherein the first point is a point having the shortest distance from the drone on the surface of the first athlete, the third value has a value greater than or equal to 0 degree and less than 360 degrees, and the first sensor includes a first distance sensor and a camera; and transmit the first value, the second value, and the third value to the server and the drone, wherein the drone is configured to: transmit information that the drone flies at the same height as the first value and is at the same height as the first value to the user device; and transmit, as at least one collection data, video data obtained by a measurement value of at least one sensor of the drone and a camera included in the first sensor to the user device, wherein the user device transmits the at least one collection data to the server, and the at least one sensor includes a plurality of distance sensors, which are radially arranged, and an IMU sensor. The system comprises: transmitting command data to the drone; transmitting an initial positioning completion signal to the user device in response to it being confirmed that the drone is located at a position corresponding to the second value and the third value, wherein the user device transmits the initial positioning completion signal to the drone; outputting a preset sound through a speaker in response to the reception of the initial positioning completion signal, and transmitting the at least one collected data to the user device while flying in a frontal direction of a first athlete while the first athlete is exercising, wherein the user device transmits the at least one collected data to the server; analyzing the at least one collected data, deriving at least one command data for locating the drone at a position corresponding to the first value, the second value, and the third value with respect to the first athlete while the first athlete is exercising, and transmitting the derived data to the user device, wherein the user device transmits the at least one command data to the drone; and extracting a part corresponding to a time when the drone flew at a position corresponding to the first value, the second value, and the third value among video data included in the at least one collected data, based on the at least one collected data, and storing the extracted part as an exercise video.

A method for providing exercise data, according to an embodiment of the present invention, comprises the steps of: transmitting, by a server, at least one command data for a drone to rotate around a stationary first athlete to a user device, wherein the user device transmits the at least one command data to the drone; generating at least one first collection data including measurement values of at least one sensor included in the drone and video data obtained by a camera included in the drone while rotating around the stationary first athlete, and transmitting the at least one first collection data to the user device, wherein the user device transmits the at least one first collection data to the server; generating, by the server, a three-dimensional human body model of the first athlete on the basis of the at least one first collection data; receiving, by the user device, a first value specifying a flight height of the drone, a second value specifying a distance between a first sensor of the drone and a first point on a surface of the first athlete, and a third value specifying an angular displacement in a direction from the first point toward the first sensor of the drone with respect to a front direction of the first athlete; and transmitting the first value, the second value, and the third value to the server and the drone, wherein the first point is a point having the shortest distance from the drone on the surface of the first athlete, the third value has a value of greater than or less than 0 degrees and less than 360 degrees, and the first sensor includes the first distance from the first sensor, wherein the first measurement value and the first sensor while the camera. The method comprises the steps of: generating at least one second collection data including obtained video data, transmitting the generated data to the user device, and transmitting at least one second collection data to the server by the user device; analyzing the at least one second collection data, deriving at least one instruction data for positioning the drone at positions corresponding to the first value, the second value, and the third value with respect to the first athlete while the first athlete is exercising, and transmitting the derived data to the user device, wherein the user device transmits the at least one instruction data to the drone; based on the at least one second collection data, extracting a portion corresponding to a time when the drone flies at positions corresponding to the first value, the second value, and the third value from video data included in the at least one second collection data, and storing the extracted portion as an exercise video; extracting a joint point from the exercise video; and based on the joint point extracted from the exercise video and a three-dimensional human body model of the first athlete, checking exercise data indicating a joint motion range of the first athlete, a joint motion speed, and a change in the joint motion range and the joint motion speed by period in a periodically repeated motion, and displaying the exercise data on the user device.

According to one embodiment of the present invention, a method for providing a synthetic video on the basis of a sports training video comprises the steps of: acquiring a motion video of a first athlete; checking the motion data of the first athlete from the motion video of the first athlete; parsing the motion video of the first athlete for each period of motion to obtain a plurality of partial motion videos corresponding to the first athlete; increasing the transparency of a first partial motion video and a second partial motion video from the plurality of partial motion videos corresponding to the first athlete, and overlaying the second partial motion video having the increased transparency, the motion data corresponding to the first partial motion video, and the motion data corresponding to the second partial motion video to generate a first synthetic video, wherein the motion data includes the range of motion of the joint of the first athlete; and transmitting the first synthetic video to a user device, and displaying the first synthetic video on the user device.

According to an embodiment of the present invention, a method for providing a synthetic video based on a sports training video comprises the steps of: obtaining, by a server, a first exercise video based on first video data captured by a drone flying in a front direction of a first athlete while the first athlete is performing the first exercise; obtaining a first background video and a first athlete video by separating a background region and the first athlete region from the first exercise video; generating a background video by synthesizing a plurality of frames of the first background video based on a flight speed of the drone and time information when the first video data is captured; generating a first synthetic video by overlaying the frames of the first athlete video on the background video based on the flight speed of the drone and the time information when the first video data is captured; transmitting the first synthetic video to a user device; and displaying the first synthetic video on the user device.

DETAILED DESCRIPTION

Figure 1A:
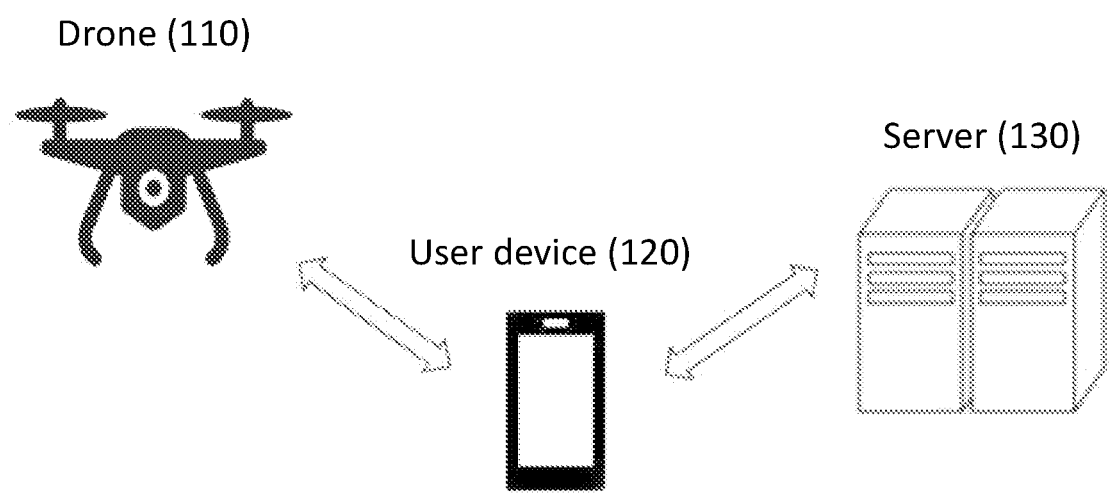
FIG. 1A illustrates an exercise video acquisition system according to various embodiments of the present invention.

The terms "comprises" and/or "comprising" used herein do not exclude the presence or addition of one or more other constituent elements in addition to the mentioned constituent elements. It should be understood that the various embodiments of the present specification and the terms used therefor are not intended to limit the technical features described in the present specification to specific embodiments, but include various changes, equivalents, or alternatives of the corresponding embodiments. In connection with descriptions of the drawings, similar reference numerals may be used for similar or related components. The singular form of the noun corresponding to the item may include one or more items unless clearly indicated otherwise in the related context. In the present specification, each of phrases such as "A or B", "at least one of A and B", "at least one of A or B", "A, B or C", "at least one of A, B and C", and "at least one of A, B, or C" may include any one of items listed together in a corresponding phrase among the phrases, or all possible combinations thereof. Terms such as "first", "second", "first", or "second" may be used to simply distinguish a corresponding component from other corresponding components, and do not limit the corresponding components in other aspects (e.g., importance or order). When a component (e.g., a first component) is referred to as "connected" to another (e.g., a second component, with or without the term "functionally" or "communicatively", it means that the component may be connected to the other component directly (e.g., by wire), wirelessly, or through a third component.

Various embodiments of the present disclosure may be implemented as software including one or more instructions stored in a storage medium (e.g., an internal memory or an external memory) readable by a machine. For example, the processor of the device may call at least one of one or more instructions stored from the storage medium and execute the same. This enables the device to be operated to perform at least one function according to the called at least one instruction. The one or more instructions may include code generated by a compiler or code that may be executed by an interpreter. The machine-readable storage medium may be provided in the form of a non-transitory storage medium. Here, the term "non-transitory" merely means that the storage medium is a tangible device and does not include a signal (e.g., an electromagnetic wave), and this term does not distinguish a case where data is semi-permanently stored in the storage medium and a case where the data is temporarily stored.

According to an embodiment, the method according to various embodiments disclosed herein may be included and provided in a computer program product. The computer program product may be a product and may be traded between a seller and a buyer. The computer program product may be distributed in the form of a machine-readable storage medium (e.g., compact disc read only memory (CD-ROM)), or may be distributed (e.g., downloaded or uploaded) via an application store (e.g., PlayStore™) or directly between two user terminals (e.g., smart phones), online. In the case of online distribution, at least a part of the computer program product may be at least temporarily stored in a machine-readable storage medium such as a manufacturer's server, a server of an application store, or a memory of a relay server, or may be temporarily generated.

According to various embodiments, each component (e.g., a module or a program) of the above-described components may include a single entity or a plurality of entities, and some of the plurality of entities may be separately disposed in other components. According to various embodiments, one or more components or steps among the above-described components may be omitted, or one or more other components or steps may be added. Alternatively or additionally, a plurality of components (e.g., a module or a program) may be integrated into one component. In this case, the integrated component may perform one or more functions of each of the plurality of components in the same or similar manner as that performed by the corresponding component among the plurality of components before the integration. According to various embodiments, steps performed by a module, a program, or another element may be executed sequentially, in parallel, repeatedly, or heuristically, one or more of the steps may be executed in a different order, omitted, or one or more other steps may be added.

FIG. 1A illustrates an exercise video acquisition system according to various embodiments of the present invention. The exercise video acquisition system 100 may include a drone 110, a user device 120, and a server 130. The drone 110 may photograph an athlete who performs exercise while flying. Here, the athlete may be not only a professional athlete but also anyone who wants to obtain an athletic video. The drone 110 may include a plurality of distance measurement sensors, an IMU sensor, and a camera. The distance measurement sensor of the drone 110 may include a distance measurement sensor radially disposed toward the outer surface of the drone, a distance measurement sensor disposed toward the ground, and a distance measurement sensor disposed toward the upper end of the drone. An example of the distance measurement sensors radially arranged toward the outer surface of the drone will be described later with reference to FIG. 5A. The distance measurement sensor of the drone 110 may be at least one of an ultrasonic sensor, an infrared sensor, a radar, a PSD sensor, an LiDAR, a ToF sensor, and a stereo camera. The IMU sensor of the drone 110 may include an acceleration sensor, a gyro sensor, and a geomagnetic sensor. The acceleration sensor included in the IMU sensor may be at least one of a piezoelectric type, a piezoresistive type, a capacitive type, and a thermal type. The gyro sensor included in the IMU sensor may be, for example, a MEMS type. The geomagnetic sensor included in the IMU sensor may be a geomagnetic sensor using at least one of a Hall effect, a magnetoresistive effect, and a magnetic impedance. The drone 110 may include a plurality of motors and communication modules for flight.

The drone 110 may transmit to the user device 120, the measurement values of the at least one sensor and the video data obtained by the camera as collection data. In addition, the drone 110 may receive command data generated by the server 130 from the user device 120 and control the plurality of motors to fly according to the command data.

The user device 120 is a device used by an athlete or a coach, and may include at least one of a smartphone, a tablet PC, or a wearable device. The user device 120 may transmit the collected data generated by the drone 110 to the server 130, and transmit the command data generated by the server 130 to the drone 110.

The server 130 may generate command data for controlling flight of the drone 110 based on the collected data generated by the drone 110. In addition, the server 130 may generate an exercise video based on the collection data generated by the drone 110, may identify the exercise data based on the exercise video, and may generate various synthetic videos based on the exercise video.

Figure 1B:
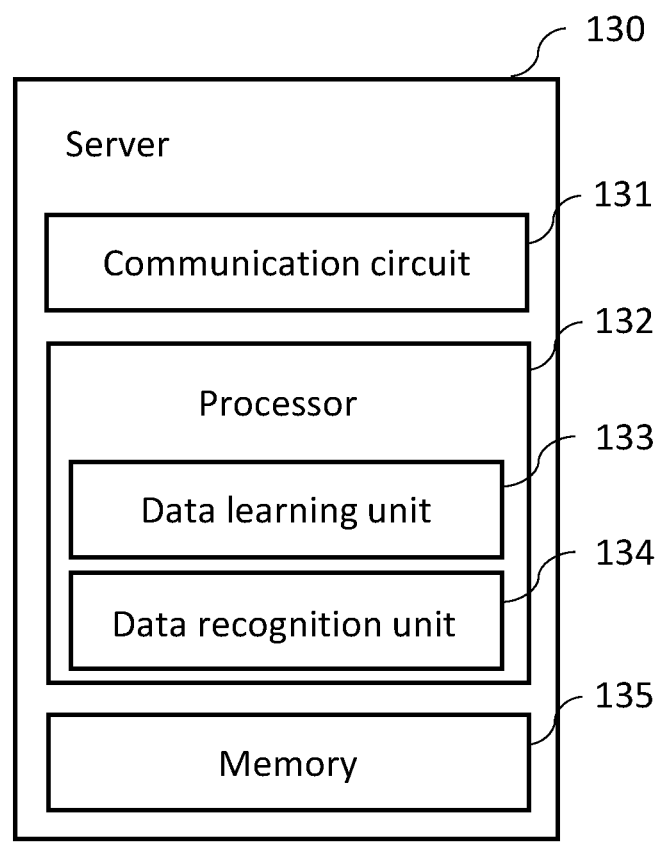
FIG. 1B illustrates feature of a server included in an exercise video acquisition system according to various embodiments of the present invention.

FIG. 1B illustrates feature of a server included in an exercise video acquisition system according to various embodiments of the present invention. Referring to FIG. 1B, the server 130 may include a communication circuit 131, a processor 132, and a memory 135. The communication circuit 131 may transmit information to another electronic device or receive information from another electronic device, and the type of communication supported by the communication circuit 131 is not limited.

The processor 132 may perform an operation based on data received through the communication circuit 131 and/or data stored in the memory 135, and may transmit at least a part of a result of the operation to another electronic device through the communication circuit 131 or may store the result in the memory 135.

The processor 132 may include a data learning unit 133 and a data recognition unit 134. The data learning unit 133 may receive joint point information extracted from one frame video of the motion video and generate an artificial intelligence model that outputs an angle at which the corresponding video is captured. The data recognition unit 134 may pre-process data and provide the pre-processed data to the data learning unit 133 for learning.

At least one of the data learning unit 133 and the data recognition unit 134 may be implemented in the form of a dedicated hardware chip for artificial intelligence, or may be implemented as a part of an existing general-purpose processor (e.g., an AP or a CPU) or a graphics-dedicated processor.

According to various embodiments, unlike the case where the data learning unit 133 and the data recognition unit 134 are represented as being included in the server 130 in FIG. 2, the data learning unit 133 and the data recognition unit 134 may be respectively mounted in separate electronic devices.

In this case, the data learning unit 133 and the data recognition unit 134 may be connected to each other in a wired or wireless manner, and model information generated by the data learning unit 133 may be provided to the data recognition unit 134, or data input to the data recognition unit 134 may be provided to the data learning unit 133 as additional learning data.

At least one of the data learning unit 133 and the data recognition unit 134 may be implemented as a software module. In this case, the software module may be stored in a non-transitory computer-readable recording medium. At least some of the software modules may be provided by an operating system (OS) or by a predetermined application.

Figure 2A:
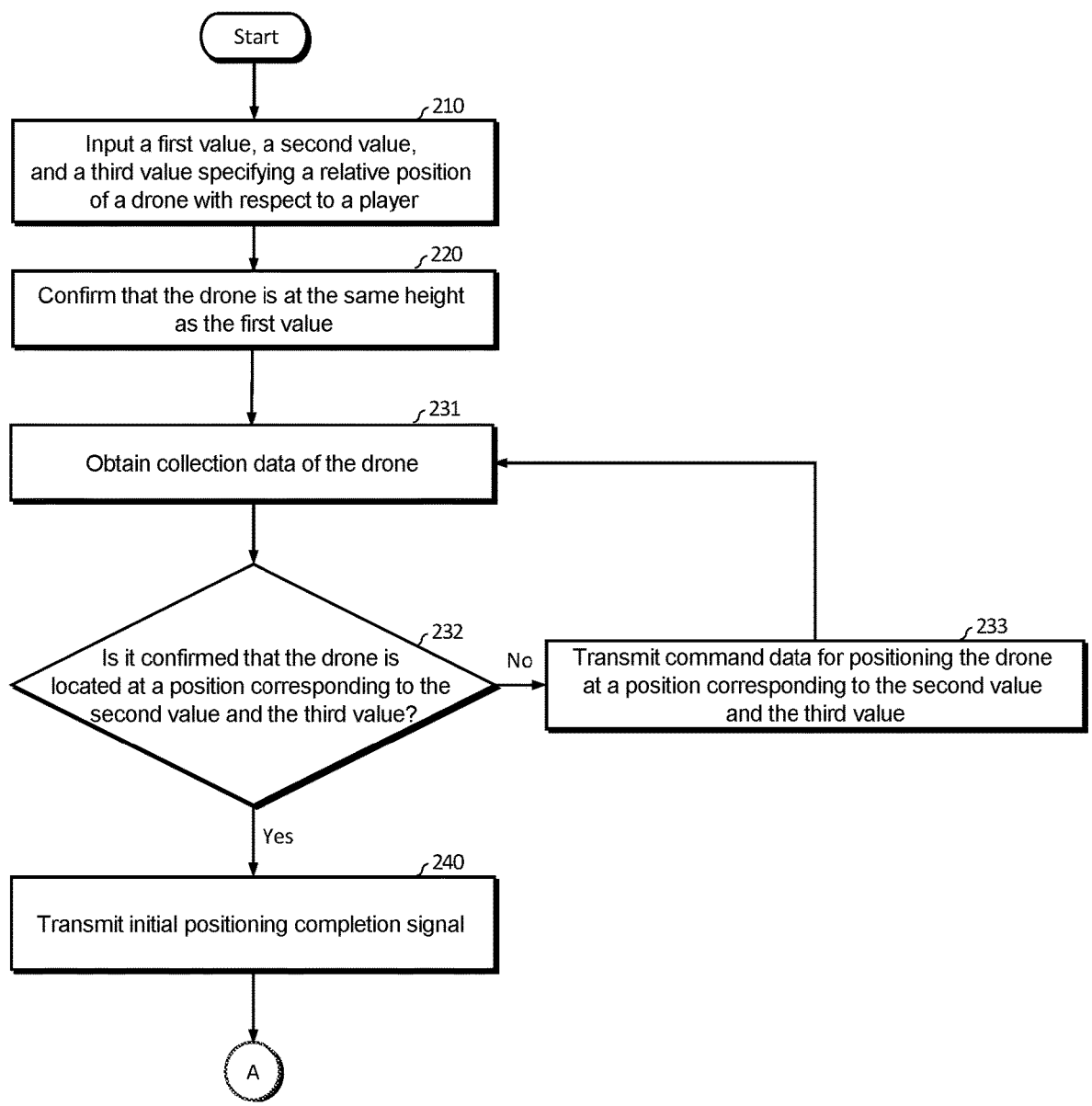
FIGS. 2A and 2B illustrate a method of acquiring an exercise video performed in a system for acquiring an exercise video, according to various embodiments of the present invention.
Figure 2B:
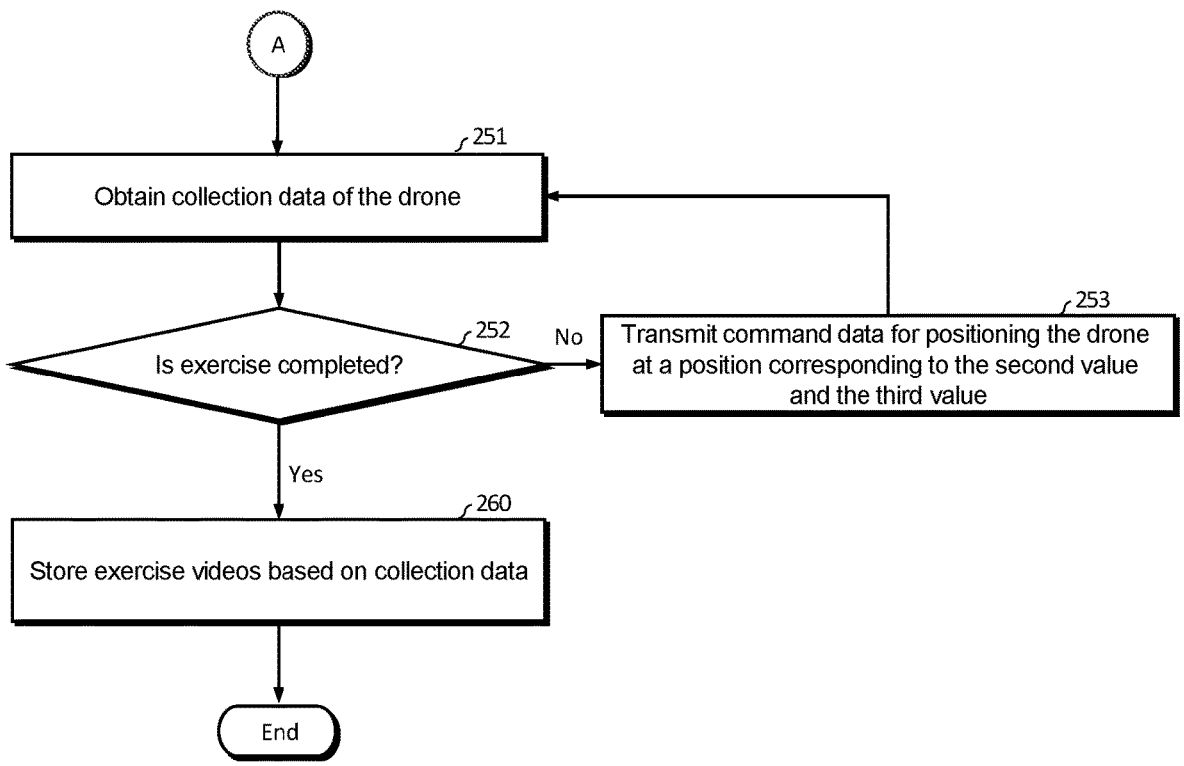

FIGS. 2A and 2B illustrate a method of acquiring an exercise video performed in a system for acquiring an exercise video, according to various embodiments of the present invention.

In step 210, the user device 120 may receive a first value, a second value, and a third value specifying a relative position of the drone with respect to the athlete.

Figure 2C:
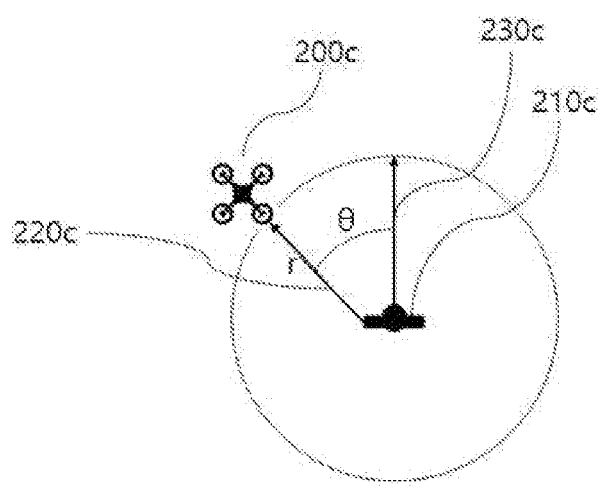
FIGS. 2C and 2D illustrate definitions of a first value, a second value, and a third value in an exercise video acquisition method according to various embodiments of the present invention.
Figure 2D:
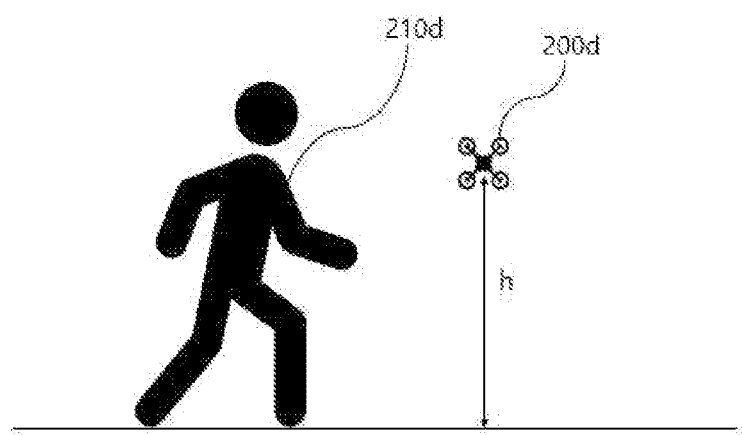

Referring to FIG. 2D, the first value may be a value specifying a flight height h of the drone 200d. The flight height h of the drone 200d is the height of the drone 200d based on the ground on which the athlete 210d is exercising. A distance measurement sensor disposed toward the ground of the drone may measure the flight height h of the drone 200d and include it as a part of the collected data.

Referring to FIG. 2C, the second value may be a value specifying a distance r between the first sensor of the drone 200c and a first point on the surface of the bow 210c. The first sensor of the drone 200c may include a distance sensor and a camera disposed toward the outer surface of the drone. The first point on the surface of the athlete 210c means a point at which the distance from the first sensor of the drone 200c is shortest among the points on the surface of the athlete 210c. A distance measurement sensor included in the first sensor of the drone 200c may measure a distance r, 220c between the first sensor and a first point on the surface of the bow 210c and include the distance r, tR as a part of the collection data.

Referring back to FIG. 2C, the third value may be a value that specifies an angular displacement θ in a direction 220c from the first point toward the first sensor of the drone 200c with respect to the front direction 230c of the athlete 210c. As will be described later with reference to FIG. 3B, the server 130 may determine the angular displacement θ of the direction 220c from the first point toward the first sensor of the drone 200c based on the front direction 230c of the bow 210c according to the measurement value of the IMU sensor and the analysis result by the artificial intelligence model for the video data obtained by the camera, and may control the drone 200c according to the comparison result of the angular displacement θ and the third value. According to various embodiments, the angular displacement θ may be defined as a counterclockwise direction having a positive value and a clockwise direction having a negative value when the user vertically looks down at the bow 210c and the drone 200c. According to various embodiments, the angular displacement θ may be specified as a value greater than or equal to 0° and less than 360°. For example, an angular displacement of −10 degrees may be defined to be equal to 350 degrees.

After step 210, the user device 120 may transmit the first value, the second value, and the third value to the drone 110 and the server 130, respectively.

In step 220, the drone 110 may fly to the same height as the first value by adjusting the thrust of at least one motor, measure the flight height h by the distance measurement sensor disposed toward the ground, and when it is identified that the drone 110 is at the same height as the first value, transmit information indicating that the drone is at the same height as the first value to the user device 120. The user device 120 may transmit to the server 130, information that the drone 110 is at the same height as the first value, and thus the server 130 may identify that the drone 110 is at the same height as the first value.

In step 231, the server 130 may obtain the collected data generated by the drone 110. The collected data may include a measurement value of at least one sensor included in the drone and video data obtained by a camera included in the first sensor. The drone 110 may generate collection data and transmit the collection data to the user device 120, and the user device 120 may transmit the collection data to the server 130.

In step 232, the server 130 may analyze the collected data to determine whether the drone 110 is located at a position corresponding to the second value and the third value. When it is determined in step 232 that the drone 110 is not located at the position corresponding to the second value and the third value, the server 130 may analyze the collected data, derive at least one command data for locating the drone at the position corresponding to the second value and the third value, and transmit the derived data to the user device 120 in step 233. The user device 120 may transmit the command data of step 233 to the drone 110. A detailed method in which the server 130 identifies whether the drone 110 is located at a position corresponding to the second value and the third value in step 232 and derives the command data in step 233 will be described with reference to FIGS. 3A and 3B. Steps 231 to 233 may be repeated until it is confirmed that the drone 110 is located at a position corresponding to the second value and the third value. Further, steps 231 to 233 may be performed when the athlete is standing at the start position before starting the exercise.

According to various embodiments, at least one calculation included in steps 231 to 233 may be performed by the drone 110. For example, the drone 110 may perform step 232 by the processor included in the drone 110 after obtaining the collected data. Thereafter, the processor of the drone 110 may derive command data for moving to a position corresponding to the second value and the third value and control at least one motor included in the drone 110 using the derived command data in step 233.

Figure 3A:
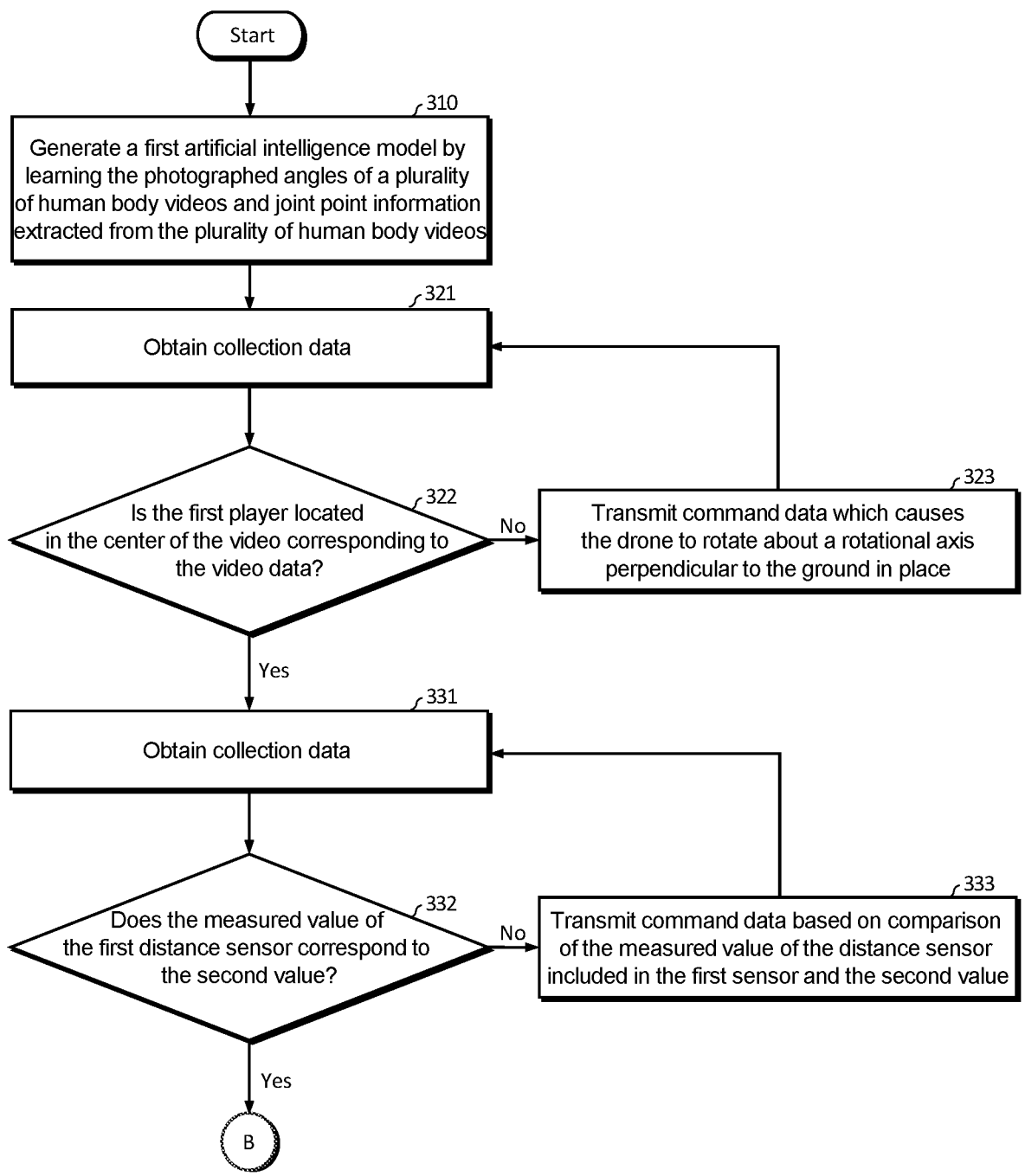
FIGS. 3A and 3B illustrate a method performed in an exercise video acquisition system, according to various embodiments of the present invention.
Figure 3B:
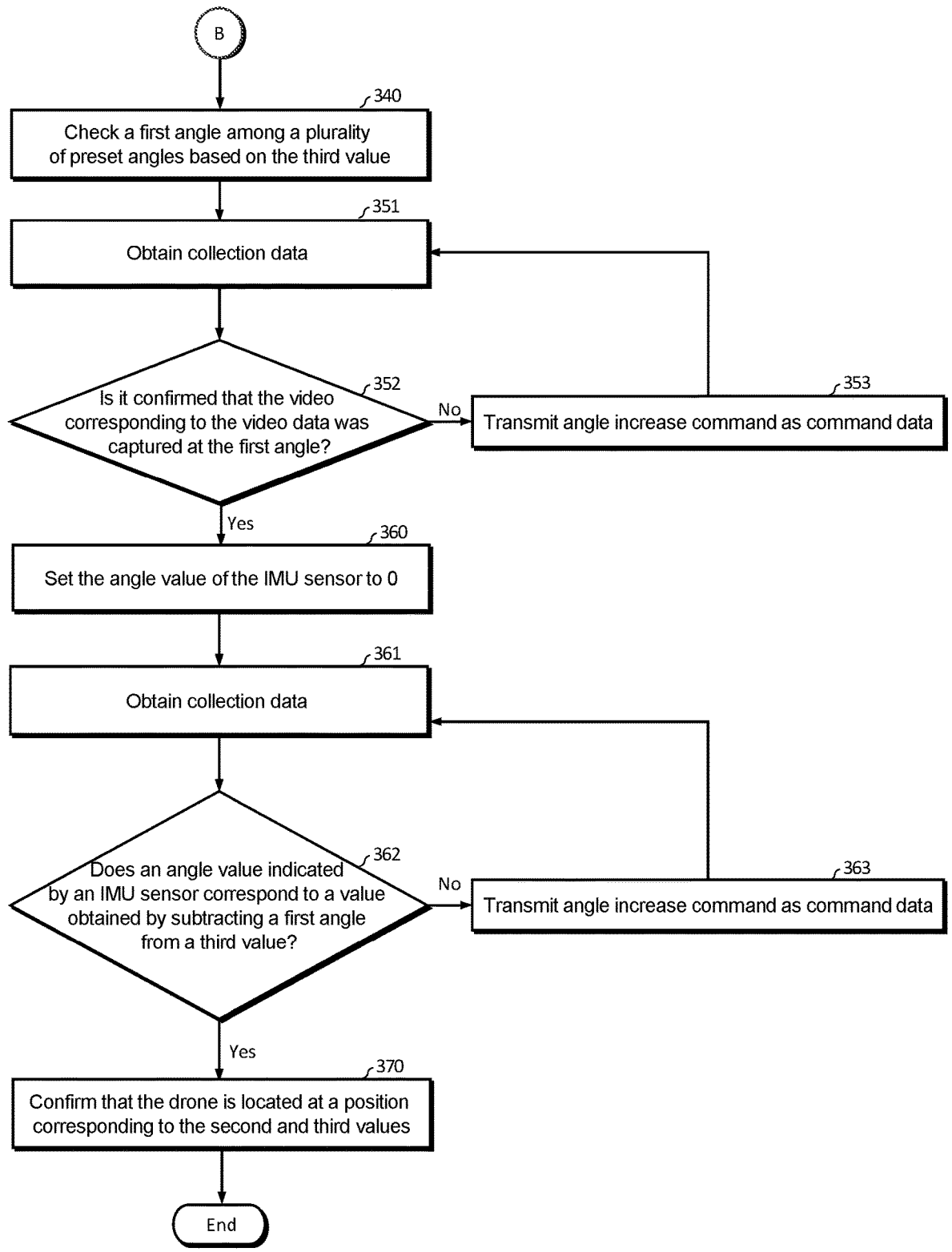
Figure 4A:
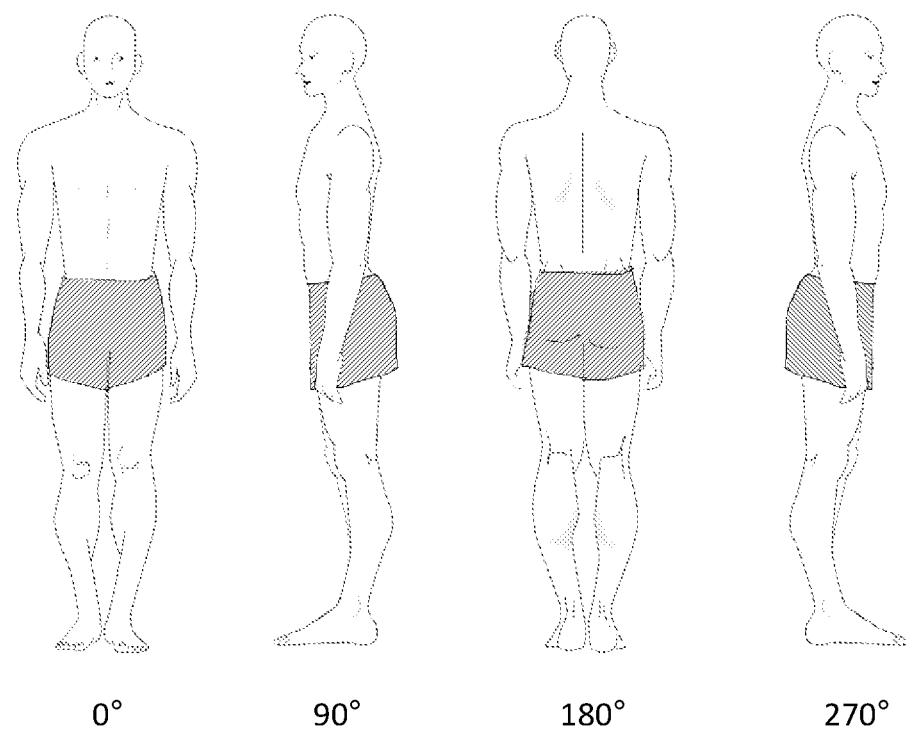
FIG. 4A illustrates an example of a plurality of predetermined preset angles according to various embodiments of the present invention.
Figure 4B:
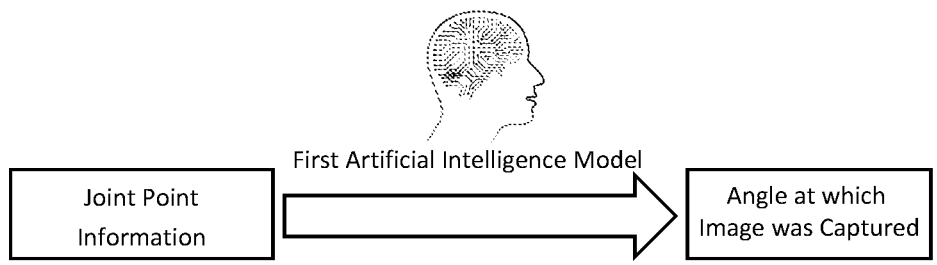
FIG. 4B illustrates input and output of a first AI model according to various embodiments of the disclosure.

FIGS. 3A and 3B illustrate a method performed in an exercise video acquisition system, according to various embodiments of the present invention. In step 310, the server 130 may generate a first artificial intelligence model by learning angles at which a plurality of human body images are captured and joint point information extracted from the plurality of human body images. Specifically, the server 130 may store a human body image database including a plurality of human body images captured at a plurality of predetermined preset angles, each of which has a value equal to or greater than 0° and less than 360°. Step 310 is a step performed before the athlete performs the exercise. The human body image database may store a plurality of human body images and an angle at which each video is captured in association with each other. The plurality of preset angles may be, for example, 0 degrees, 90 degrees, 180 degrees, and 270 degrees, as illustrated in FIG. 4A. Thereafter, the server 130 may extract joint point information from each of the plurality of human body images included in the human body image database. Thereafter, the server 130 may generate the first artificial intelligence model by learning the angles at which the plurality of human body images are captured and the joint point information extracted from the plurality of human body images. As illustrated in FIG. 4B, the first AI model may be an AI model that receives joint point information of a video and outputs an angle at which the corresponding video is captured. Since the first AI model has learned videos captured at a plurality of preset angles, when the input video is a video captured at one of 0°, 90°, 180°, and 270°, the first AI model may output an angle at which the corresponding video is captured with high accuracy. A learning method for generating the first artificial intelligence model is not limited. For example, the first AI model may be generated by various machine learning techniques. For example, at least one of a Recurrent Neural Network (RNN), a Convolution Neural Network (CNN), an Artificial Neural Network (ANN), and a transformer model may be used for learning for generating a first artificial intelligence model.

Figure 5A:
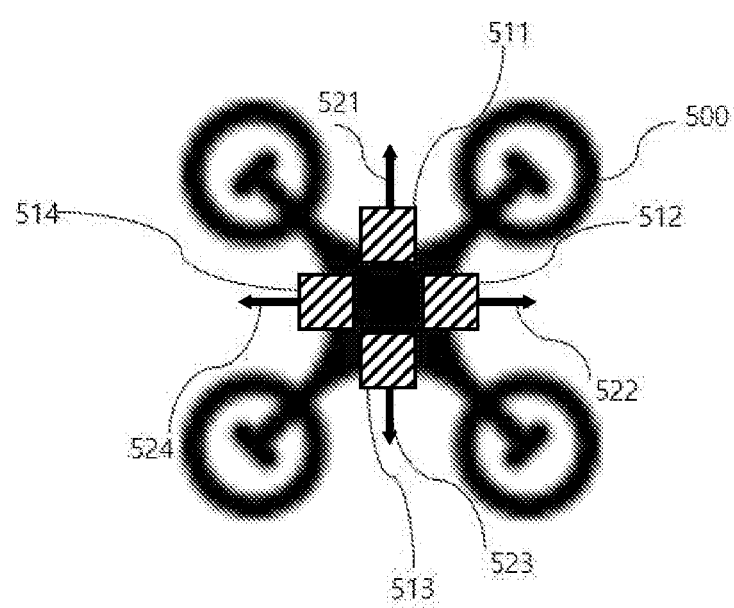
FIG. 5A illustrates a drone, according to various embodiments of the present disclosure.

In step 321, the server 130 may obtain collected data. In step 322, the server 130 may analyze the video data included in the collected data to determine whether the first athlete is located in the center of the video corresponding to the video data. Referring to FIG. 5A, the drone 500 may include a plurality of distance sensors 511, 512, 513, and 514 that are radially disposed and measure a distance toward a side surface of the drone, and the plurality of distance sensors 511, 512, 513, and 514 may measure a distance from the drone body to an external object existing in outward directions 521, 522, 523, and 524. Among the plurality of distance sensors 511, 512, 513, and 514, the first sensor 511 faces the same direction 521 as the photographing direction of the camera. Returning to operation 322, when it is determined that the first athlete is located at the center of the video corresponding to the video data, it may mean that the first sensor 511 faces the first athlete.

Figure 5B:
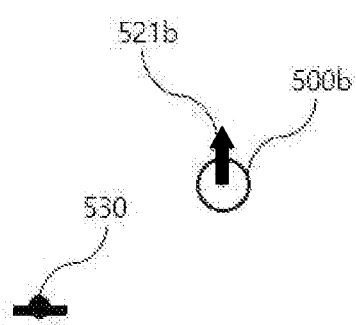
FIGS. 5B and 5C illustrate an operation in which a drone rotates in place, according to various embodiments of the present invention.
Figure 5C:
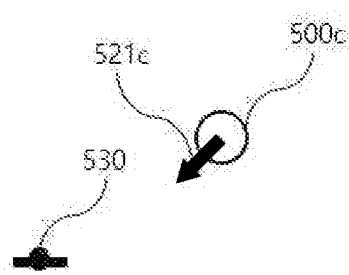

When it is determined in step 322 that the first athlete is not positioned at the center of the video corresponding to the video data, the server 130 may transmit command data to the user device 120 so that the drone rotates about a rotation axis perpendicular to the ground at the spot until the first athlete is positioned at the center of the video corresponding to the video data in step 323. The command data transmitted to the user device 120 may be transmitted to the drone 110. FIGS. 5B and 5C illustrate an operation in which a drone rotates in place, according to various embodiments of the present invention. As shown in FIG. 5B, the drone 500b may be positioned such that a direction 521b in which the first sensor faces is different from a direction in which the athlete 530 is located. The drone that has received the command data causing the drone to rotate about the rotation axis perpendicular to the ground in place continues to transmit the collected data while rotating about the rotation axis perpendicular to the ground in place (step 321). That is, steps 321 to 323 are repeated until the first sensor faces the athlete 530, and when it is confirmed in step 322 that the first athlete is located at the center of the video corresponding to the video data, the positional relationship between the drone and the first athlete is illustrated in FIG. 5C. Referring to FIG. 5C, it can be seen that the drone 500c only rotates about a rotation axis perpendicular to the ground while maintaining the position as it is, compared to the drone 500b, and the direction 521c that the first sensor faces is a direction in which the athlete 530 is located.

According to various embodiments, at least one calculation included in steps 321 to 323 may be performed by the drone 110. For example, the drone 110 may perform step 322 by the processor included in the drone 110 after obtaining the collected data. Thereafter, in step 323, the processor of the drone 110 may derive command data for rotating about a rotation axis perpendicular to the ground in place, and control at least one motor included in the drone 110 using the derived command data.

If it is determined in step 322 that the first athlete is positioned at the center of the video corresponding to the video data, the server 130 obtains the collected data again in step 331. The server 130 determines whether the measurement value of the first distance sensor corresponds to the second value in step 332. When it is determined that the measurement value of the first distance sensor does not correspond to the second value, the server 130 may transmit the command data to the user device 120 based on the comparison between the measurement value of the distance sensor included in the first sensor and the second value in step 333. The user device 120 may transmit the received command data to the drone 110 in step 333. The command data transmitted in step 333 may be command data that causes the drone to move in a direction opposite to the first direction 521*c* in which the first distance sensor faces when the measurement value of the distance sensor included in the first sensor is smaller than the second value, that is, causes the drone to move further away from the bow. On the contrary, when the measurement value of the distance sensor included in the first sensor is greater than the second value, the command data may be command data that causes the drone to move in the first direction 521*c*, that is, causes the drone to become closer to the athlete. Operations 331 through 333 may be repeated until it is determined that the measurement value of the first distance sensor corresponds to the second value, like operations 321 through 323.

According to various embodiments, at least one calculation included in steps 331 to 333 may be performed by the drone 110. For example, the drone 110 may obtain the collected data in step 331, and then perform step 332 by the processor included in the drone 110. Thereafter, the processor of the drone 110 may derive command data and control at least one motor included in the drone 110 using the derived command data in step 333.

If it is determined in step 332 that the measurement value of the first distance sensor corresponds to the second value, the server 130 performs operation 340. In step 340, the server 130 may identify a first angle smaller than the third value and having the largest value among a plurality of preset angles. For example, when the plurality of preset angles are 0 degrees, 90 degrees, 180 degrees, and 270 degrees as illustrated in FIG. 4A, and the third value is 100 degrees, the first angle may be 90 degrees. As another example, when the third value is 190 degrees, the first angle may be 180 degrees. According to various embodiments, operation 340 may be performed by the processor of the drone 110.

In step 351, the server 130 may obtain the collected data again. In step 352, the server 130 may identify whether it is identified by the first AI model that the video corresponding to the video data included in the collected data obtained in step 351 is captured at the first angle. When the video corresponding to the video data included in the obtained collection data is input to the first artificial intelligence model in step 351, if it is not confirmed that the video is captured at the first angle, the server 130 may transmit an angle increase command to the user device 120 as command data in step 353. The user device 120 may transmit an angle increase command to the drone 110.

Figure 6A:
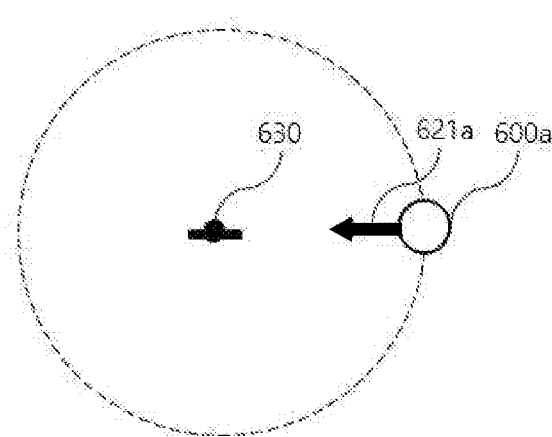
FIGS. 6A to 6D illustrate an operation of a drone according to an angle increase command, according to various embodiments of the present invention.

The angle increase command is a command for flying the drone to increase the angular displacement θ as shown in FIG. 2C, and will be described with reference to FIGS. 6A to 6D. FIG. 6A illustrates the drone before receiving the angle increase command, and the drone 600*a* is illustratively stopped at a position where the first direction 621*a* faces the first athlete 630 and an angular displacement is 270 degrees from the front direction of the athlete. The angle increase command may include (a) a command for moving the drone by a preset first distance in a direction perpendicular to the first direction 621*a*, (b) a command for causing the drone to rotate on a plane parallel to the ground in place until the first athlete is located at the center of the video corresponding to the video data, and (c) a command for moving the drone in the first direction until the measurement value of the first distance sensor corresponds to the second value.

Figure 6B:
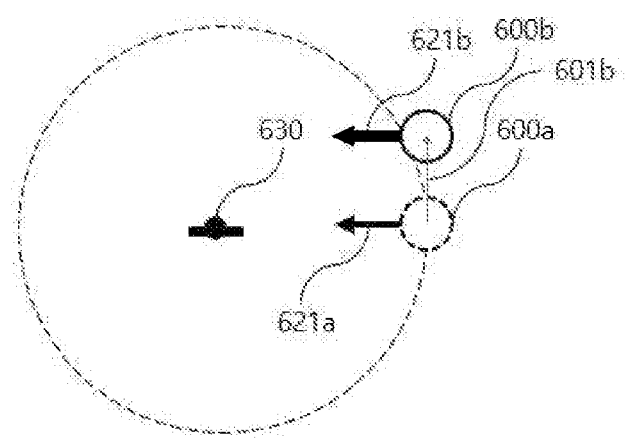

First, FIG. 6B illustrates a shape of a drone 600*b* moved according to a command for moving the drone by a preset first distance in a direction perpendicular to a first direction 621*a*. Referring to the position of the drone, the drone moves a preset first distance in a direction 601*b* perpendicular to the first direction 621*a* as compared with the position 600*a* before the movement, and there is no rotation of the drone with respect to a rotation axis perpendicular to the ground. As a result, the first direction 621*b* is parallel to the first direction 621*a* before the movement but does not face the first athlete 630.

Figure 6C:
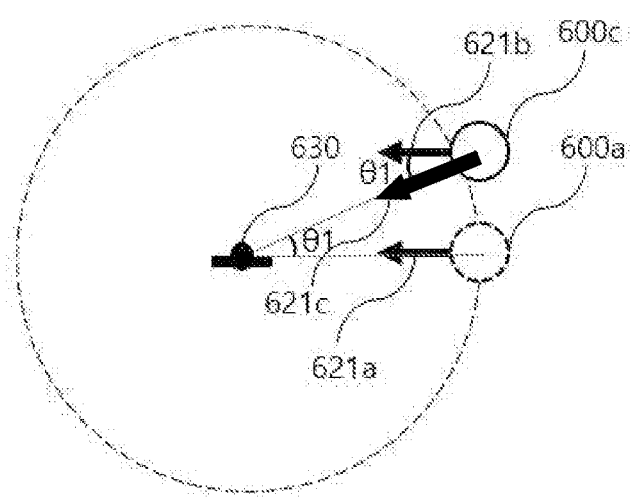

Next, FIG. 6C illustrates a shape of the drone 600*c* moving according to a command for causing the drone to rotate on a plane parallel to the ground in place until the first athlete is located at the center of the video corresponding to the video data. Describing the position of the drone, the position is the same as the position of the drone 600*b* before the movement, and as a result of the rotation about the rotation axis perpendicular to the ground, the first direction 621*c* faces the first athlete 630, and as a result, the first athlete is positioned at the center of the video corresponding to the video data. In this case, the angle θ1 at which the drone rotates until the first athlete is positioned at the center of the video corresponding to the video data is equal to the angular displacement change θ1 of the direction toward the drone with respect to the first athlete 630, and the angular displacement is accumulated and recorded by the IMU sensor. Therefore, the server 130 may confirm a change in angular displacement in the direction toward the drone 600*c* with respect to the first athlete 630, that is, how much the drone has rotated with respect to the first athlete 630.

Figure 6D:
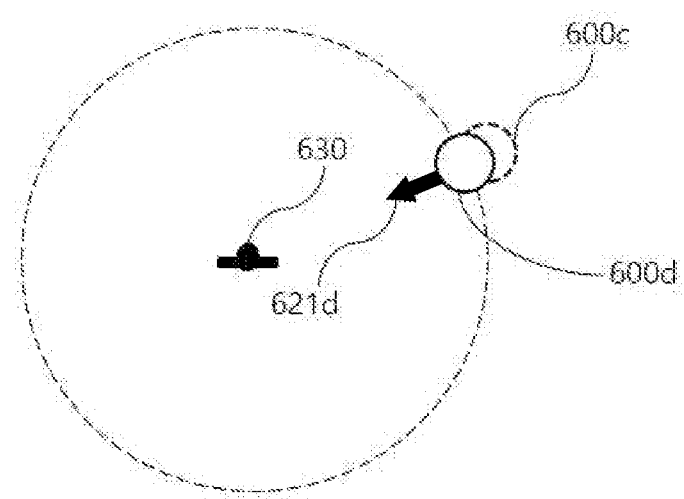

Next, FIG. 6D shows the drone 600*d* moving according to a command for moving the drone in the first direction until the measurement value of the first distance sensor corresponds to the second value. It can be seen that only the position of the drone 600*d* is changed while the first direction 621*d* is maintained to be the same as the previous first direction 621*c*.

After operation 353 is performed, operations 351, 352, and 353 may be repeated until video data corresponding to a video confirmed to have been captured at the first angle is included in the collected data and received by the server 130. When it is determined that the video data is captured at the first angle, the server 130 may set the angle value of the IMU sensor to 0 in step 360, and may receive the collected data again in step 361.

According to various embodiments, at least one calculation included in steps 351 to 353, and 360 may be performed by the drone 110. For example, the drone 110 may perform step 352 by the processor included in the drone 110 after obtaining the collected data. Thereafter, the processor of the drone 110 may generate an angle increase command and control at least one motor included in the drone 110 using the generated angle increase command in step 353.

In step 362, the server 130 may determine whether the angle value indicated by the IMU sensor corresponds to a value obtained by subtracting the first angle from the third value. When the angle value indicated by the IMU sensor does not correspond to a value obtained by subtracting the first angle from the third value, the IMU sensor may transmit an angle increase command as command data in step 363. Operations 361, 362, and 363 may be repeated until the angle value indicated by the IMU sensor corresponds to a value obtained by subtracting the first angle from the third value. When the angle value indicated by the IMU sensor corresponds to a value obtained by subtracting the first angle from the third value, the server 130 may identify that the drone 110 is located at a position corresponding to the second value and the third value in step 370.

According to various embodiments, at least one calculation included in steps 361 to 363, and 370 may be performed by the drone 110. For example, the drone 110 may perform step 362 by the processor included in the drone 110 after obtaining the collected data. Thereafter, the processor of the drone 110 may generate an angle increase command and control at least one motor included in the drone 110 using the generated angle increase command in step 363.

When it is confirmed through the process illustrated in FIGS. 3A and 3B that the drone 110 is located at a position corresponding to the second value and the third value in step 232, the server 130 may transmit an initial location setting completion signal to the user device 120 in step 240. The user device 120 may transmit an initial positioning completion signal to the drone. In addition, the user device 120 may output a preset sound through an output device (e.g., a speaker) in response to reception of the initial location setting completion signal, or may display that the initial location is set through the display.

According to various embodiments, when operation 232 is performed by the processor of the drone 110, operation 240 may be performed by the drone 110 generating and transmitting an initial location setting completion signal to the user device 120.

The drone 110 generating or receiving the initial location setting completion signal may also output a predetermined sound through the speaker in response to the generation of the initial location setting completion signal or in response to the reception of the initial location setting completion signal. The preset sound output through the speaker of the drone 110 or the user device 120 may be, for example, the same as the sound indicating the actual start of the game.

After operation 240 is performed, the athlete may start to exercise by listening to the sound output through the speaker or viewing a message displayed on the display of the user device 120. The drone 110 may obtain collection data while flying in the front direction of the athlete while the athlete is exercising and transmit the collection data to the user device 120, and the user device 120 may transmit the collection data to the server 130 (step 251).

The server 130 may check whether the exercise is completed in step 252. According to various embodiments, the server 130 may analyze the video data in the collected data, and may determine that the exercise is completed when the time during which the athlete moves at the predetermined speed or less is equal to or greater than a predetermined first time. According to various embodiments, the server 130 may determine that the exercise is completed when receiving a signal indicating that the exercise is completed from the user device 120 that has received an input of a athlete or a coach.

When it is determined that the exercise is not completed, that is, before the exercise is completed, the server 130 may derive at least one command data for positioning the drone at a position corresponding to the first value, the second value, and the third value and transmit the at least one command data to the user device 120 in step 253. The user device 120 may transmit the command data of step 253 to the drone 110.

When the exercise is not completed, the process of deriving the command data from the server 130 is similar to the above description. First, since the value h that is the flight height of the drone 110 is included in the collected data, the server 130 may compare the value h in the collected data with the first value, transmit command data for increasing the propulsive force on the ground of the drone when the value h is smaller than the first value, and transmit command data for decreasing the propulsive force on the ground of the drone when the value h is larger than the first value.

The r value, which is the distance between the drone 110 and the athlete, is a measurement value of a distance sensor included in the first sensor when the athlete is located in the center of the video corresponding to the video data. Accordingly, the server 130 may control the drone 110 so that the drone 110 is located at the position corresponding to the second value by performing steps 321 to 323 and steps 331 to 333.

The θ value, which is an angular displacement in a direction from the athlete toward the drone with respect to the front direction of the athlete, is changed by a rotation angle when the drone rotates so that the athlete is positioned at the center of the video corresponding to the video data, as described in FIG. 6C. Since the operation starts in a state in which the θ value is set to be equal to the third value immediately before the start of the exercise, the server 130 may rotate the drone so that the athlete is positioned at the center of the video corresponding to the video data so as to maintain the angular displacement after the start of the exercise, transmit the angle increase command as the command data when it is determined that the angular displacement has decreased, and transmit the angle decrease command as the command data when it is determined that the angular displacement has increased. The contents of the angle decrease command are the same as those described above with reference to FIGS. 6A to 6D, but are a direction in which the angular displacement decreases only in the movement direction in FIG. 6B, that is, a direction opposite to the movement direction 601b illustrated in FIG. 6B.

According to various embodiments, at least one calculation included in steps 252 to 253 may be performed by the drone 110. For example, the drone 110 may obtain the collected data in step 251, and then perform step 252 by the processor included in the drone 110. Thereafter, the processor of the drone 110 may derive command data for moving to a position corresponding to the second value and the third value and control at least one motor included in the drone 110 using the derived command data in step 253.

If it is determined that the exercise is completed, the server 130 may store the exercise video based on the collected data during the exercise, that is, the collected data received in step 251, in step 260. The moving video may be obtained by extracting a portion corresponding to a time when the drone flies at a position corresponding to the first value, the second value, and the third value from video data included in the at least one collected data collected in step 251.

According to various embodiments, when at least one calculation included in steps 252 to 253 is performed by the drone 110, operation 260 may be performed by transmitting collected data while the drone 110 performs the exercise to the server 130, and extracting and storing, by the server 130, a portion corresponding to a time when the drone flies at a position corresponding to the first value, the second value, and the third value among the video data included in the collected data.

Figure 7:
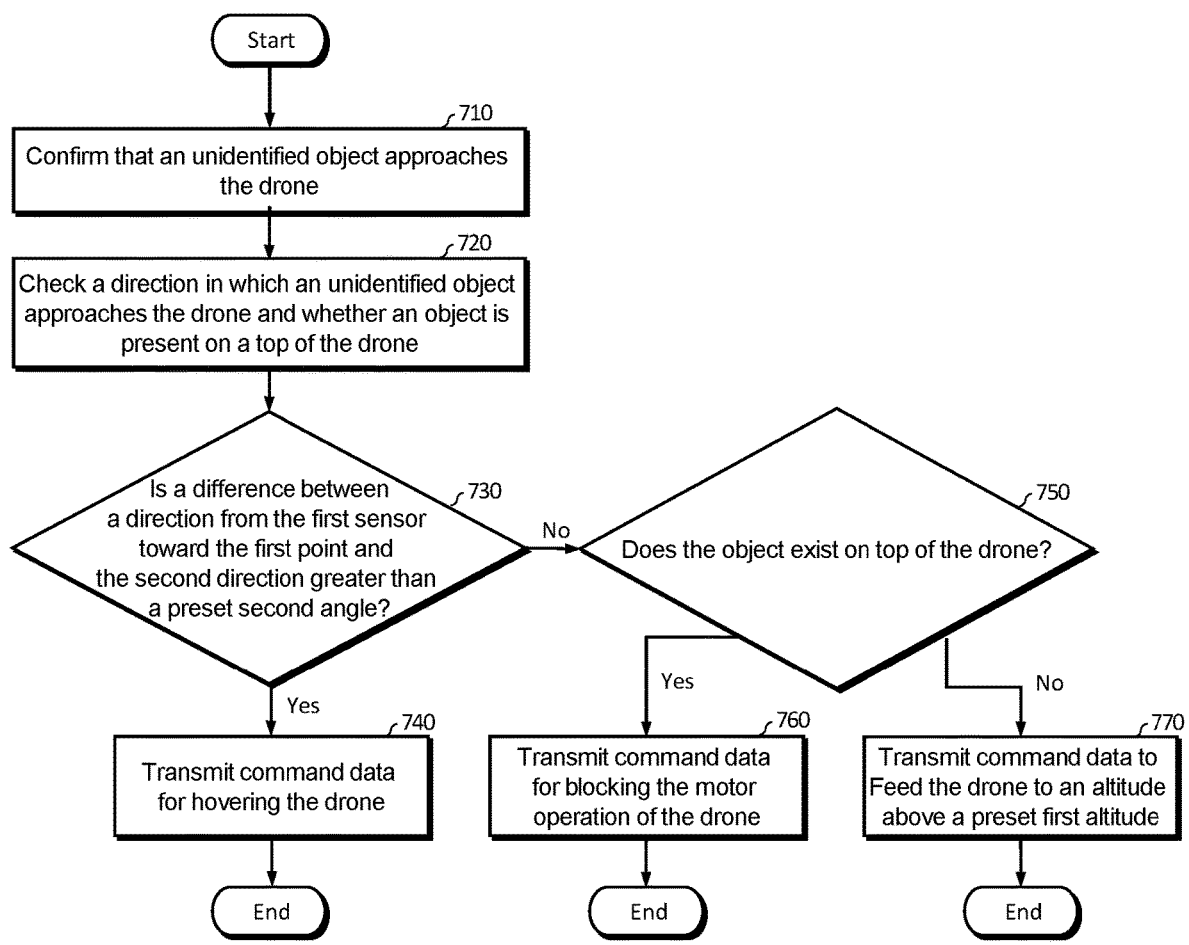
FIG. 7 illustrates an avoidance driving method performed in an exercise video acquisition system according to various embodiments of the present invention.

FIG. 7 illustrates an avoidance driving method performed in an exercise video acquisition system according to various embodiments of the present invention. The avoidance maneuver is an operation performed to protect the drone 110 or a athlete when an external object approaches the drone 110 while the drone 110 is in flight.

In step 710, the server 130 may identify that an unidentified object approaches the drone 110 based on at least one collected data while the first athlete is exercising. For example, in a situation in which it is confirmed through video data that the first sensor faces the athlete, when an unidentified object is detected in one of the other distance sensors (for example, the sensors 512, 513, and 514 of FIG. 5A) facing the lateral direction of the drone except for the first sensor and a distance from the unidentified object is getting closer, it may be determined that the unidentified object is approaching the drone 110.

In step 720, the server 130 may verify a direction in which the unidentified object approaches the drone and whether the object is present on an upper portion of the drone. The server 130 may confirm a direction in which the sensor detecting the unidentified object detects as a direction in which the unidentified object approaches the drone. For example, when an unidentified object is detected through the sensor 512 of FIG. 5A and a distance from the unidentified object is getting shorter, it may be confirmed that a direction in which the unidentified object approaches the drone is a direction opposite to the detection direction 522 of the sensor 512. The server 130 may determine that an object is present on the top of the drone when the measurement value in the distance measurement sensor disposed toward the top of the drone is less than or equal to a predetermined value.

In step 730, the server 130 may determine whether a difference between the direction from the first sensor toward the first point and the second direction is greater than a predetermined second angle. The second direction means a direction in which the unidentified object approaches the drone.

When it is determined in step 730 that the difference between the direction toward the first point from the first sensor and the second direction is greater than the preset second angle, the server 130 may transmit the command data for hovering the drone to the user device 120 in step 740. The user device 120 may transmit the command data to the drone 110. The hovering means that the drone 110 does not rotate about a rotation axis perpendicular to the ground, does not change its position, and remains in place.

When it is determined in step 730 that the difference between the direction toward the first point from the first sensor and the second direction is equal to or smaller than the preset second angle, the server 130 may determine whether an object is present on the upper end of the drone in step 750.

When it is determined in step 750 that the object is present on the upper end of the drone, the server 130 may transmit command data for blocking the motor operation of the drone in step 760. The user device 120 may transmit the command data to the drone 110. The drone 110 receiving the command data of step 760 blocks the operation of the motor, and as a result, immediately falls to the ground.

When it is determined in step 750 that there is no object on the upper end of the drone, the server 130 may transmit command data for rapidly increasing the drone to an altitude of a predetermined first altitude or higher in step 770. The user device 120 may transmit the command data to the drone 110. The drone 110 receiving the command data of step 770 rapidly rises only the altitude to an altitude of a predetermined first altitude or higher while maintaining the coordinates on the plane parallel to the ground.

According to various embodiments, at least one operation included in each step of FIG. 7 may be performed by the drone 110. Operations 710 to 730 and 750 may be performed by a processor included in the drone 110. Operations 740, 760, and 770 may be performed by generating instruction data corresponding to the processor included in the drone 110 and controlling at least one motor included in the drone 110 using the generated instruction data.

According to various embodiments, an avoidance start method different from that shown in FIG. 7 may be performed. The server 130 or the processor of the drone 110 may identify that the unidentified object approaches the drone 110 within a predetermined second distance, based on at least one piece of collected data while the first athlete is exercising. When the unidentified object approaching the drone 110 within the predetermined second distance is identified, the server 130 or the processor of the drone 110 may continuously monitor the distance between the unidentified object and the drone 110 based on at least one collected data. When it is identified that the distance between the unidentified object and the drone 110 is shorter than the second distance and is equal to or shorter than a predetermined third distance, the server 130 or the processor of the drone 110 may identify whether an object is present on the upper end of the drone on the basis of the collected data, generate command data for blocking the motor operation of the drone when the object is present on the upper end of the drone, and generate command data for rapidly raising the drone to a altitude of a predetermined first altitude or higher when the object is not present on the upper end of the drone.

The server 130 or the processor of the drone 110 may identify that the first athlete approaches the drone 110 within a predetermined second distance, based on at least one collected data while the first athlete is exercising. Here, the second distance may be a value smaller than the second value described above with reference to FIG. 2C. When it is confirmed that the first athlete has approached the drone 110 within the predetermined second distance, the server 130 or the processor of the drone 110 may generate command data for allowing the distance between the drone 110 and the first athlete to be a second value, based on the at least one collected data. When it is identified that the distance between the first athlete and the drone 110 is shorter than the second distance and is equal to or shorter than a predetermined third distance, the server 130 or the processor of the drone 110 may identify whether an object is present at the upper end of the drone on the basis of the collected data, generate command data for blocking the motor operation of the drone when the object is present at the upper end of the drone, and generate command data for rapidly increasing the altitude of the drone to a predetermined first altitude or higher when the object is not present at the upper end of the drone.

Although not shown in the drawings, according to various embodiments, the server 130 may determine and respond to a case in which the camera of the drone 110 is covered by an external object and thus collection of normal video data is impossible. The server 130 may determine that the camera is covered by an external object when the specific proportion of the area having the brightness less than or equal to the preset first brightness in the video corresponding to the video data is equal to or greater than the preset specific proportion, and when such a situation is detected, may transmit command data for maintaining the motor rotation speed, the tilt angle, and the traveling direction of the drone for a preset first time to the user device. The user device 120 may transmit the corresponding command data to the drone 110.

In addition, when the state in which the specific proportion of the area having the brightness that is equal to or less than the preset first brightness in the video corresponding to the video data is equal to or greater than the preset specific proportion lasts for a preset second time or more, the server 130 may stop transmitting the command data and transmit a message indicating that the drone is switched to the manual mode to the user device. In this case, the operation of the drone 110 may be controlled by the athlete or the coach, rather than by the server 130. For example, the signal for manually controlling the drone 110 may be input to the user device 120.

According to various embodiments, the server 130 may control the drone 110 to fly along the runner that is changed as the runner is changed in the mooring situation. The server 130 may store the average color value of the top and the average color value of the bottom of the first athlete who is stopped before transmitting the initial position setting completion signal. Thereafter, it may be confirmed that there is a second athlete different from the first athlete in the video corresponding to the video data collected while the first athlete's exercise is performed. Various artificial intelligence models capable of identifying the shape of a person in video data may be used to identify the second athlete. When it is confirmed that the second athlete is in the video, the server 130 may confirm an average color value of the top and an average color value of the bottom of the second athlete.

When the difference between the average color value of top of the second athlete and the average color value of top of the first athlete is equal to or less than a predetermined fourth value, or the difference between the average color value of bottom of the second athlete and the average color value of bottom of the first athlete is equal to or less than a predetermined fifth value, the server 130 may identify the moving direction of the second athlete and the moving direction of the first athlete. Here, the fourth value and the fifth value may be sufficiently small to be determined as the same color when viewed with the naked eye. According to various embodiments, the server 130 may receive an exception handling color from the user device 120, and may control the drone to continuously track only the first athlete without confirming the movement direction of the second athlete when the difference between the average color value of top of the second athlete and the average color value of top of the first athlete is equal to or less than a preset fourth value, and the difference between the average color value of top of the first athlete and the exception handling color is equal to or less than the preset fourth value, even when the difference between the average color value of top of the second athlete and the average color value of top of the first athlete is equal to or less than the preset fourth value. The exception handling color is a color that is commonly used as sportswear and everyday wear and is rarely used for team division, and may be determined according to a user input among, for example, black and/or gray. According to various embodiments, the server 130 may search various keywords indicating exercise among posts on social media, recognize a person type on the post filtered as a result of the search, extract a color of a video and a color of a bottom when the person type is recognized, database appearance frequencies of the color of the video and the color of the bottom extracted from the filtered posts, and designate the color of the video or the color of the bottom having a high appearance frequency as an exception handling color. Various keywords indicating exercise may be previously designated by an administrator of a server. According to various embodiments, the server 130 may search for various keywords indicating sportswear among posts on the Internet open market, obtain a database of the latter photos included in the post filtered as the search result, recognize a person type in each photo included in the latter photo database, extract a color of the top and a color of the bottom when the person type is recognized, make a database of appearance frequencies of the color of the top and the color of the bottom extracted from the filtered posts, and designate the color of the top or the color of the bottom having a high appearance frequency as an exception handling color. Various keywords indicating the sportswear may be previously designated by an administrator of the server.

According to various embodiments, the server 130 may transmit the specified exception handling color information to the user device, and the user device may display the exception handling colors.

Similarly, even when the difference between the average color value of the bottoms of the second athlete and the average color value of the bottoms of the first athlete is equal to or less than the preset fifth value, when the difference between the average color value of the bottoms of the second athlete and the exception handling color is equal to or less than the preset fifth value and the difference between the average color value of the bottoms of the first athlete and the exception handling color is equal to or less than the preset fifth value, the server 130 may control the drone to continuously track only the first athlete without checking the moving direction of the second athlete.

When the second athlete moves in the same direction as the average movement direction of the drone for a predetermined second time and the first athlete moves in a direction different from the movement direction of the drone for a second time, the server 130 that has checked the movement direction of the second athlete and the movement direction of the first athlete may change the target to be tracked by the drone from the first athlete to the second athlete. That is, the server 130 may derive at least one command data for locating the drone at a position corresponding to the first value, the second value, and the third value with respect to the second athlete and transmit the derived command data to the user device 120. The user device 120 may transmit at least one command data to the drone.

Figure 8:
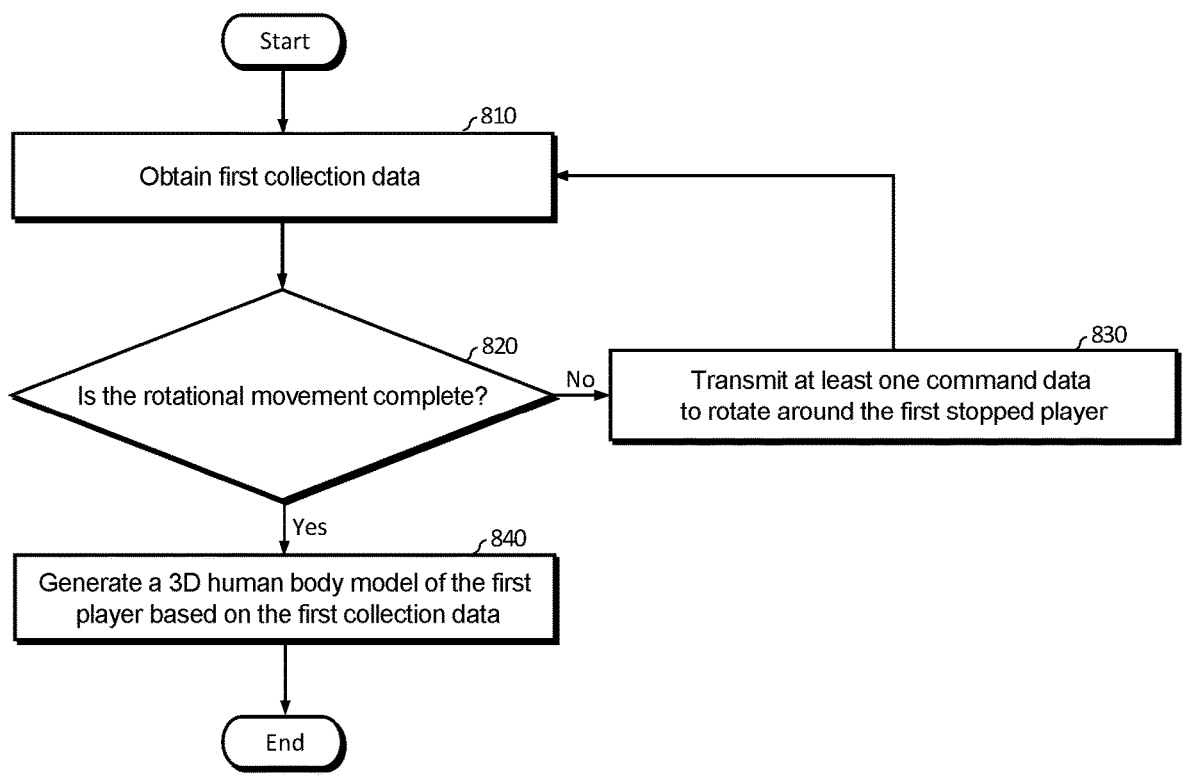
FIG. 8 illustrates a 3D human body model generation method performed in an exercise video acquisition system according to various embodiments of the present invention.

FIG. 8 illustrates a 3D human body model generation method performed in an exercise video acquisition system according to various embodiments of the present invention. The generation of the 3D human body model of FIG. 8 may be performed in a state in which the athlete is stopped before the athlete starts exercising.

In step 810, the server 130 may obtain first collected data collected by the drone 110.

In step S820, the server 130 may determine whether the rotation is completed. Completion of the rotational motion means that the drone 110 has hovered around the athlete a predetermined number of times. The server 130 may confirm through video analysis that the drone is located at the smallest angle (for example, 0 degree) among the plurality of preset angles, and may increase the angular displacement of the drone by repeating the angle increase command starting from 0 degree. Similar to steps 351 to 363 of FIG. 3B, the server 130 may identify the angular displacement θ of the drone 110 whenever the angular displacement θ is a plurality of preset angles based on the first artificial intelligence model described above with reference to FIG. 4B, and may identify a value obtained by adding the measurement value of the IMU sensor to the identified angular displacement as the angular displacement of the current drone. Similar to steps 351 to 363 of FIG. 3B, the server 130 may reset the measurement value of the IMU sensor to 0 whenever the angular displacement θ of the drone 110 becomes a plurality of preset angles.

When the rotation is not completed, in step 830, the server 130 may transmit to the user device 120, at least one command data to rotate around the first athlete who has stopped. The user device 120 may transmit the command data of step 830 to the drone 110. The command data of operation 830 may include command data for making the distance between the first sensor of the drone and the bow a predetermined first distance, and the above-described angle increase command.

When the rotational motion is completed, in step 840, the server 130 may generate a 3D human body model of the first athlete based on the first collected data collected in step 810. The server 130 may extract joint points from a video corresponding to the video data included in the first collection data, and generate a 3D human body model of the first athlete based on joint point information obtained from various angles.

According to various embodiments, at least one calculation included in each step of FIG. 8 may be performed by the drone 110 rather than the server 130. The checking operation in step 820 may be performed by a processor included in the drone 110. Operation 830 may be performed by generating instruction data in a processor included in the drone 110 and controlling at least one motor included in the drone 110 using the generated instruction data. Step 840 may also be performed by the processor included in the drone 110.

Figure 9:
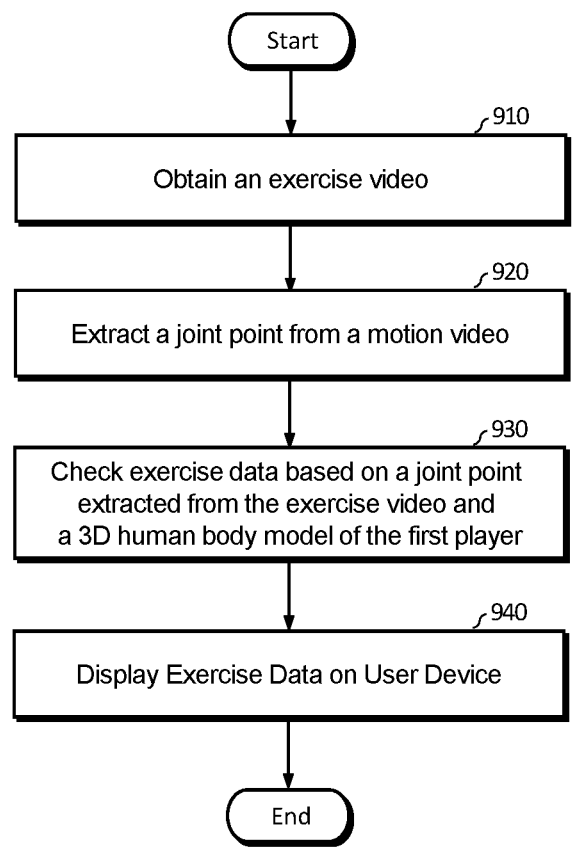
FIG. 9 illustrates an exercise data acquisition method performed in an exercise video acquisition system according to various embodiments of the present invention.

FIG. 9 illustrates an exercise data acquisition method performed in an exercise video acquisition system according to various embodiments of the present invention. In step 910, the server 130 may obtain an exercise video. Here, the exercise video refers to an exercise video stored in step 260 of FIG. 2B, and the exercise video is a video obtained when a relative position with respect to a athlete of the drone is a position specified by a first value, a second value, and a third value input to the user device.

In step 920, the server 130 may extract joint points from each of the videos constituting each frame of the exercise video.

In step 930, the server 130 may identify the exercise data based on the joint point extracted from the exercise video and the 3D human body model of the first athlete. The exercise data may include a joint operation range and a joint operation speed of the first athlete, and a change in the joint operation range and the joint operation speed for each period in a periodically repeated operation. The 3D human body model of the first athlete refers to the 3D human body model generated through the process of FIG. 8. The server 130 may transmit the confirmed exercise data to the user device, or may generate a synthetic video by overlaying the confirmed exercise data on the exercise video, and may transmit the generated synthetic video to the user device.

Figure 10A:
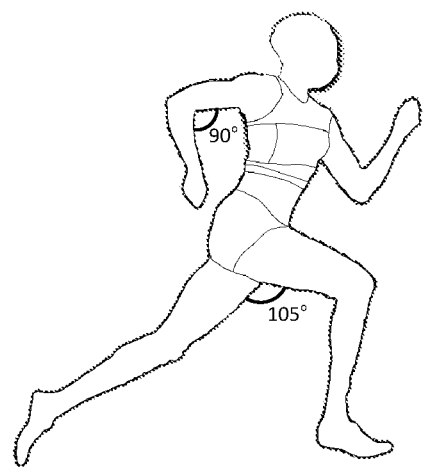
FIGS. 10A and 10B illustrate an example in which exercise data is displayed, according to various embodiments of the present invention.
Figure 10B:
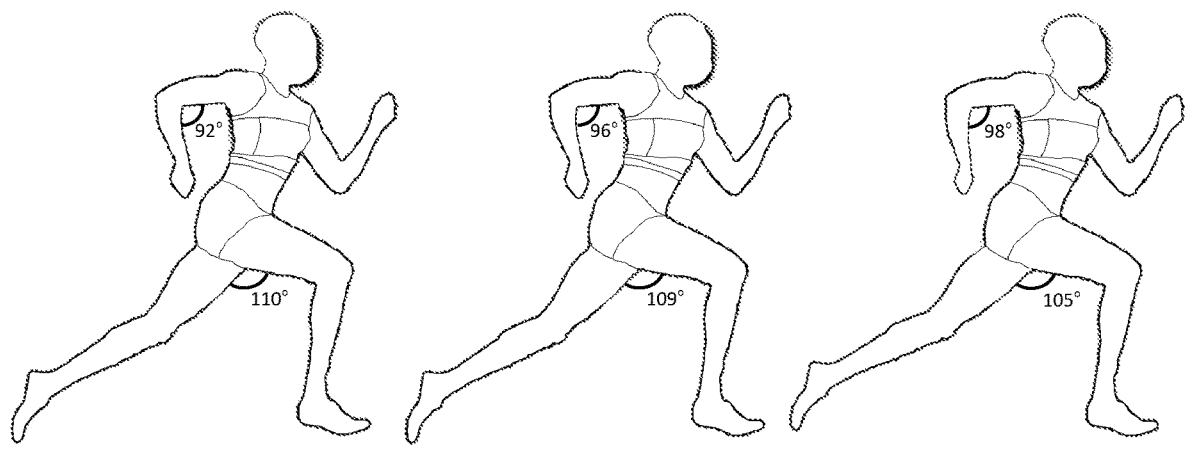

In step 940, the user device 120 may display the exercise data. Examples of displaying exercise data are illustrated in FIGS. 10A and 10B. In the example of FIG. 10A, a movable range of a joint and a body contour of a athlete are displayed as exercise data. In the example of FIG. 10B, a change in a joint movement range and a body contour of a athlete for each repetition period of a running motion that the athlete periodically repeats are displayed as exercise data.

Figure 11:
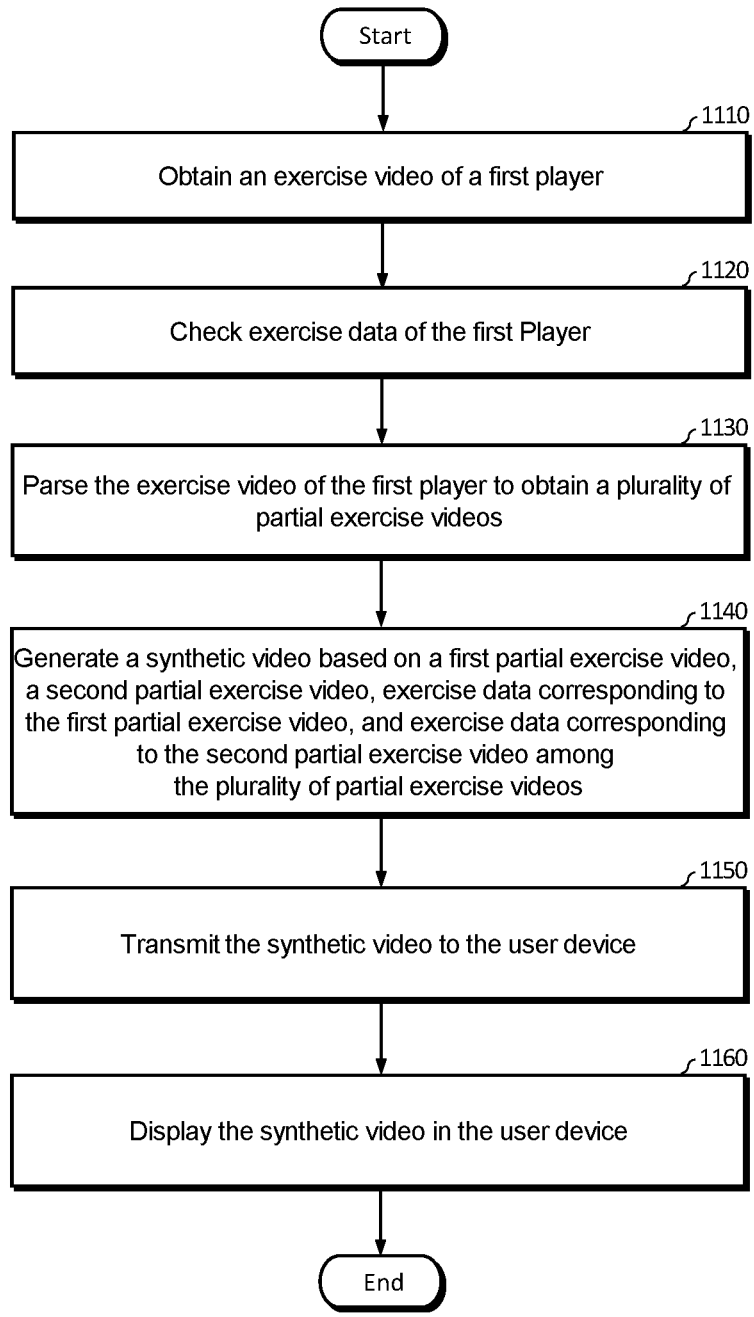
FIG. 11 illustrates a method of providing a synthetic video according to various embodiments of the present invention.

FIG. 11 illustrates a method of providing a synthetic video according to various embodiments of the present invention. In step 1110, the server 130 may obtain an exercise video. Here, the exercise video refers to an exercise video stored in step 260 of FIG. 2B, and the exercise video is a video obtained when a relative position with respect to a athlete of the drone is a position specified by a first value, a second value, and a third value input to the user device.

In step 1120, the server 130 may identify the exercise data of the first athlete from the exercise video of the first athlete. The method for obtaining the exercise data has been described above with reference to FIGS. 8 and 9.

In step 1130, the server 130 may obtain a plurality of partial exercise videos by parsing the exercise video of the first athlete. The server 130 may parse the exercise video for each repetition period when the exercise is repeated. Alternatively, the server 130 may parse the exercise video according to a predetermined time interval. Alternatively, the server 130 may parse the exercise video according to a predetermined recording point. For example, in the case of 100 m running, the motion video may be parsed at a point 30 m, a point 50 m, a point 80 m, and a point 100 m. The server 130 may determine which frame of the moving video corresponds to a time point passing through a specific point (a point 30 m, a point 50 m, a point 80 m, and a point 100 m) based on the time-based linear movement speed of the drone 110 included in the collected data.

According to various embodiments, various algorithms for parsing the moving video for each repetition period of the repetitive moving motion may be used. For example, the server 130 may extract an angle A formed by three joint points of the left knee, the pelvis, and the right knee from the exercise video, based on the analysis of the joint points, and may parse the exercise video based on a time when a value of the angle A is largest within a predetermined time range.

Figure 12A:
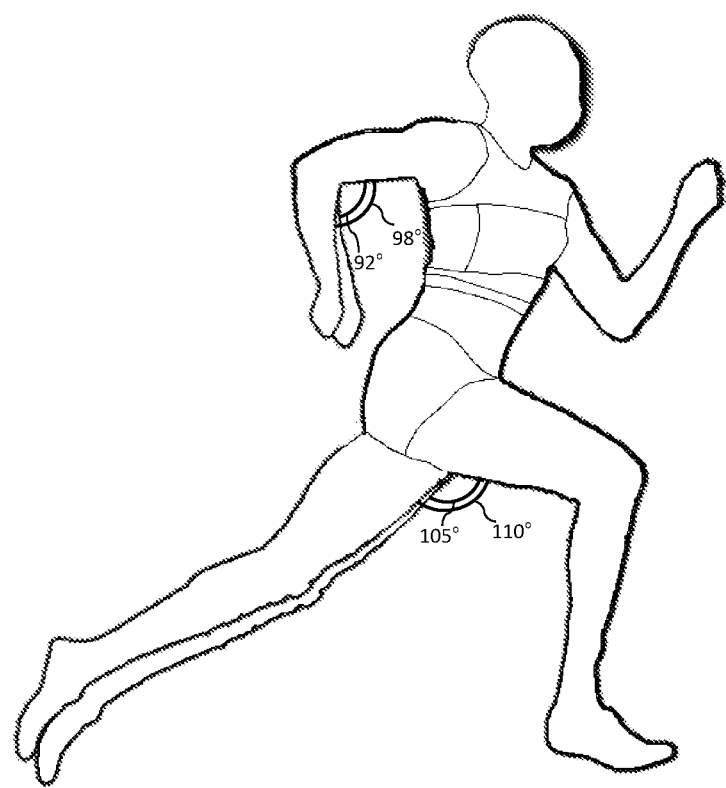
FIGS. 12A and 12B illustrate an example of a synthetic video provided according to various embodiments of the present invention.

In step S1140, the server 130 may generate a synthetic video based on a first partial exercise video, a second partial exercise video, exercise data corresponding to the first partial exercise video, and exercise data corresponding to the second partial exercise video among the plurality of partial exercise videos. For example, as illustrated in FIG. 12A, a synthetic video may be generated by increasing transparency of two exercise videos and overlaying two partial exercise videos having increased transparency and exercise data corresponding to the two exercise videos.

Figure 12B:

According to various embodiments, the server 130 may generate a synthetic video by synthesizing three or more partial motion videos and motion data corresponding thereto. For example, as illustrated in FIG. 12B, four partial exercise videos and exercise data corresponding thereto may be overlaid and displayed on the synthetic video.

In step 1150, the server 130 may transmit the synthetic video generated in step 1140 to the user device. In step 1160, the user device may display a synthetic video. As illustrated in FIGS. 12A and 12B, exercise data corresponding to different partial videos may be displayed in different colors.

Unlike the method described with reference to FIG. 11, which synthesizes and provides partial videos corresponding to different timings in a single exercise when the same athlete performs the single exercise, according to various embodiments, partial videos corresponding to the same timings in two exercise videos may be synthesized and provided based on exercise videos captured while different athletes perform the same exercise. That is, the server 130 may obtain the exercise video of the second athlete, may check the exercise data of the second athlete from the exercise video of the second athlete, may obtain a plurality of partial exercise videos corresponding to the second athlete by parsing the exercise video of the second athlete for each exercise motion cycle, may increase transparency of a third partial exercise video corresponding to a time point at which the first partial exercise video is captured among the plurality of partial exercise videos corresponding to the second athlete, may generate a second synthetic video by overlaying the third partial exercise video having the increased transparency, the exercise data corresponding to the first partial exercise video, and the exercise data corresponding to the third partial exercise video on the first partial exercise video having the increased transparency, and may transmit the second synthetic video to the user apparatus. The user device may display the second synthetic video in the form illustrated in FIGS. 12A and 12B.

Figure 13:
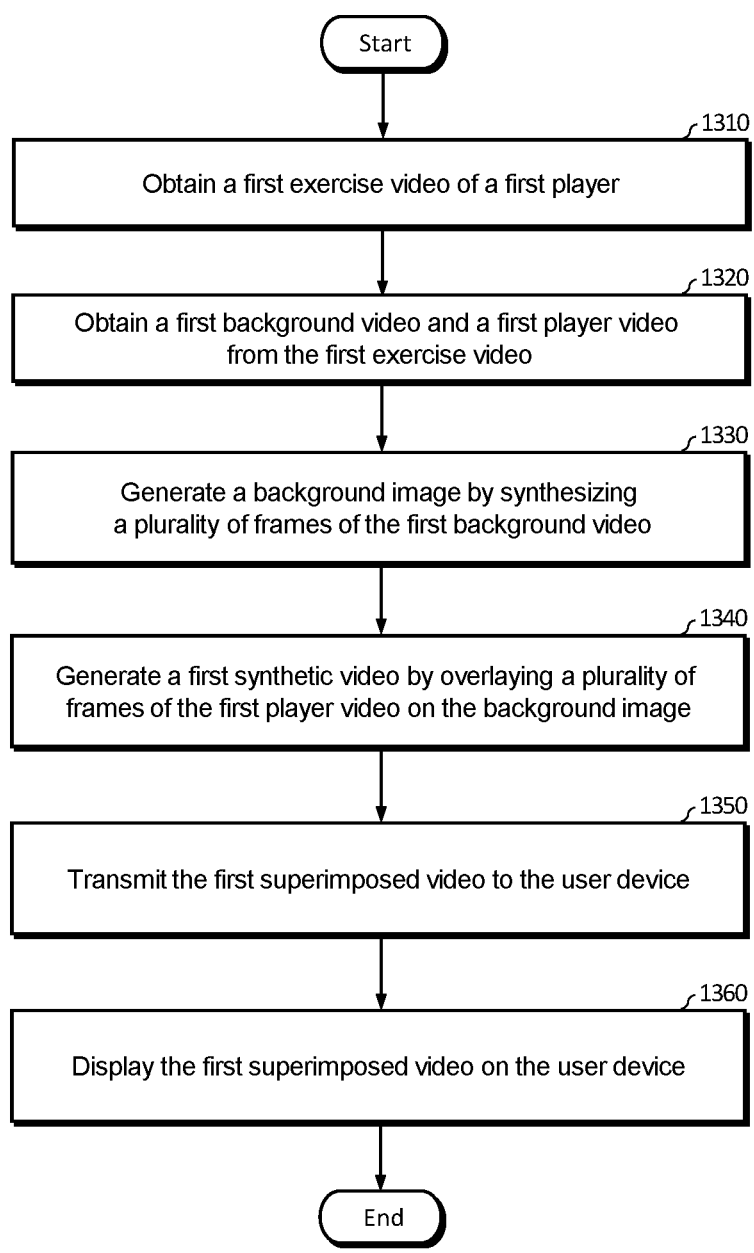
FIG. 13 illustrates a method of providing a synthetic video according to various embodiments of the present invention.

FIG. 13 illustrates a method of providing a synthetic video according to various embodiments of the present invention. FIG. 13 illustrates a method of providing a whole process of exercise as a single synthetic video so that a change in motion during exercise can be viewed at a time.

In step 1310, the server 130 may obtain a first exercise video of a first athlete. Here, the exercise video refers to an exercise video stored in step 260 of FIG. 2B, and the exercise video is a video obtained when a relative position with respect to a athlete of the drone is a position specified by a first value, a second value, and a third value input to the user device.

Figure 14A:
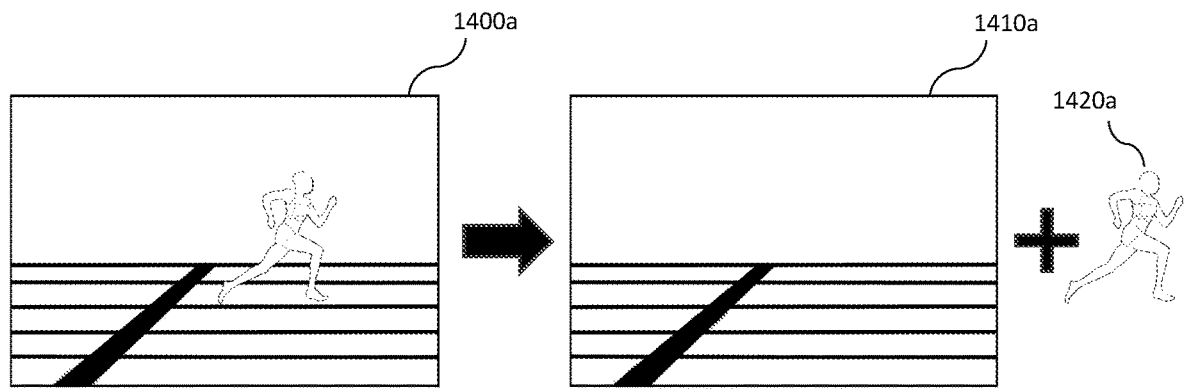
FIG. 14A illustrates an example of a background video and a athlete video obtained according to various embodiments of the present invention.

In step 1320, the server 130 may obtain a first background video and a first athlete video by separating a background area and a first athlete area from the first exercise video. Referring to FIG. 14A, the server 130 may obtain a first background video 1410a and a first athlete video 1420a from a first exercise video 1400a.

Figure 14B:
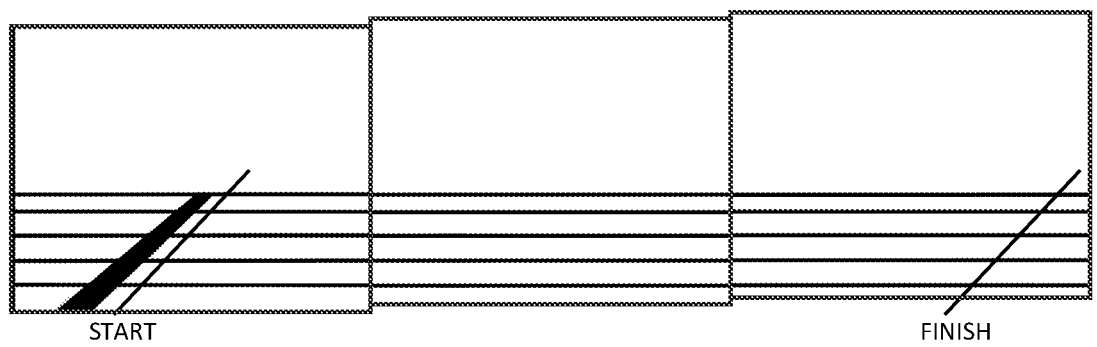
FIG. 14B illustrates an example of a background video obtained according to various embodiments of the present invention.

In step S1330, the server 130 may synthesize a plurality of frames of the first background video to generate a background video. The server 130 may generate a background video by synthesizing a plurality of frames of the first background video based on the flight speed of the drone and the time information when the first video data is captured, which are included in the collected data that is the basis of the first exercise video of the first athlete. According to various embodiments, the server 130 may learn a video of a departure line and a destination line of a land track, recognize the departure line and the destination line shown in the video data based on the determination of the similarity, and generate a background video so that the departure line and the destination line appear in the background video as shown in FIG. 14B.

Figure 14C:
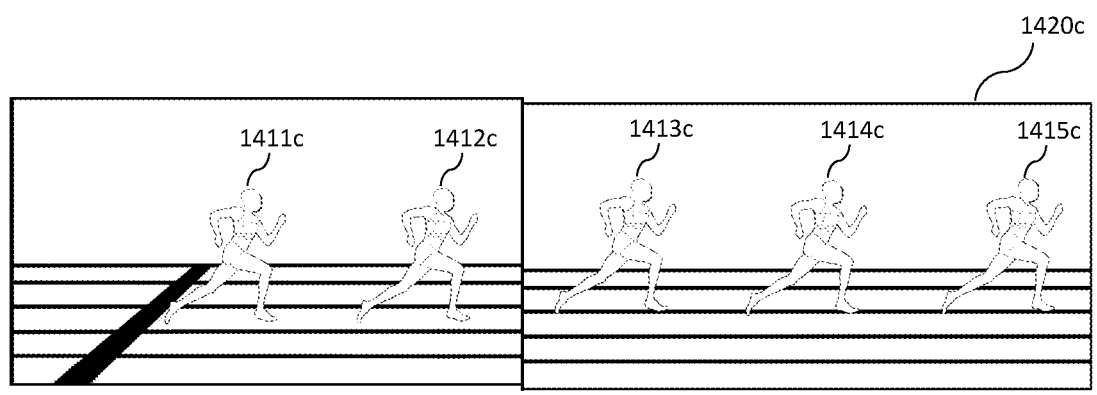
FIG. 14C illustrates an example of a synthetic video obtained according to various embodiments of the present invention.

In step 1340, the server 130 may generate a first synthetic video by overlaying a plurality of frames of the first athlete video on the background video. The server 130 may determine where the plurality of frames of the first athlete video correspond to on the background video based on the flight speed of the drone and the time information when the first video data is captured, and generate a first synthetic video 1420c in which the plurality of frames 1411c, 1412c, 1413c, 1414c, and 1415c of the first athlete video are overlaid on the background video, as illustrated in FIG. 14C.

In step 1350, the server 130 may transmit the first synthetic video to the user device. In step 1360, the user device may display a first superimposed video. When the first synthetic video 1420c is reproduced, only the initial frames 1411c of the first athlete video are initially displayed, frames 1412c corresponding to the corresponding timing are reproduced at the timing at which the actual athlete reaches the 1412c position, and a plurality of frames of the first athlete video may be sequentially reproduced in such a manner that the last frame of the initial frames 1411c remains stationary.

FIG. 14A illustrates an example of a background video and a athlete video obtained according to various embodiments of the present invention.

FIG. 14B illustrates an example of a background video obtained according to various embodiments of the present invention.

FIG. 14C illustrates an example of a synthetic video obtained according to various embodiments of the present invention.

Figure 15:
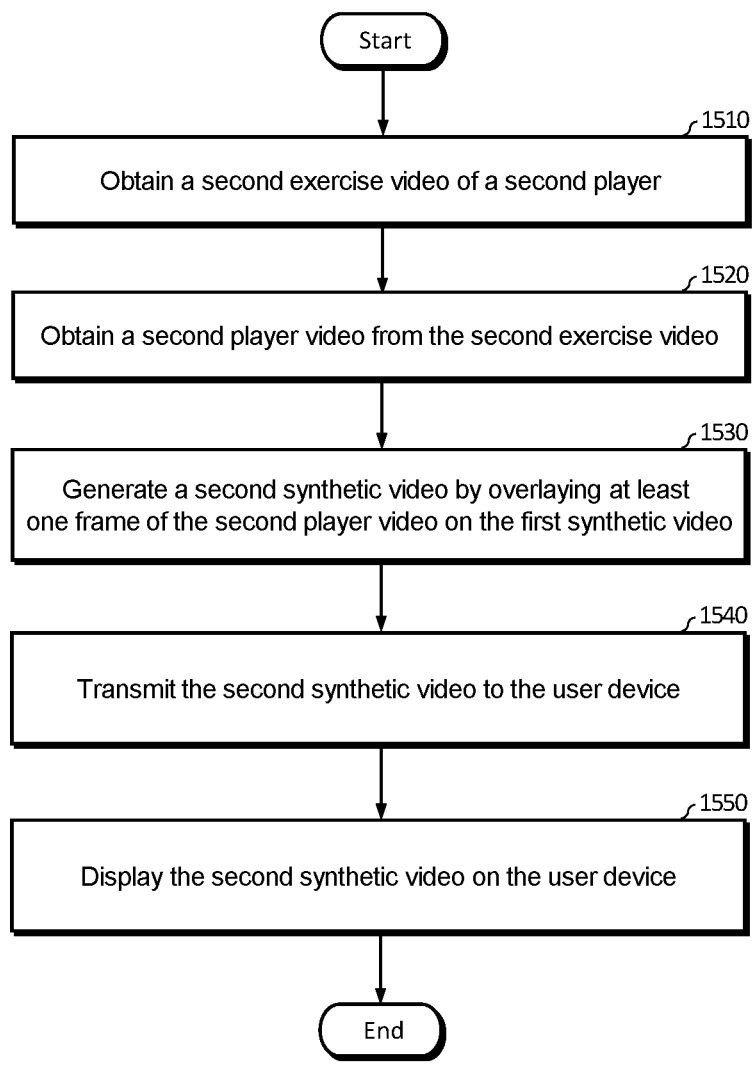
FIG. 15 illustrates a method of providing a synthetic video according to various embodiments of the present invention.

FIG. 15 illustrates a method of providing a synthetic video according to various embodiments of the present invention. In step 1510, the server 130 may obtain a second exercise video of a second athlete. The second exercise video may be a video obtained by photographing a scene in which the second athlete performs the same exercise as that performed by the first athlete, for example, 100 m running. Likewise, the motion video refers to a motion video stored in step 260 of FIG. 2B, and the motion video is a video obtained when a relative position with respect to a athlete of the drone is a position specified by a first value, a second value, and a third value input to the user device.

In step 1520, the server 130 may obtain a second athlete video by separating a background area and a second athlete area from the second exercise video.

In step 1530, the server 130 may generate a second synthetic video by overlaying at least one frame of the second athlete video on the first synthetic video described above with reference to FIG. 13. The server 130 may determine where the plurality of frames of the second athlete video correspond to on the background video based on the flight speed of the drone and the time information when the video data are captured, which are included in the collected data that is the basis for obtaining the second athlete video, and generate the second synthetic video by overlaying the corresponding frame on the first synthetic video.

In step 1540, the server 130 may transmit the second synthetic video to the user device, and in step 1550, the user device may display the second synthetic video.

Figure 16A:
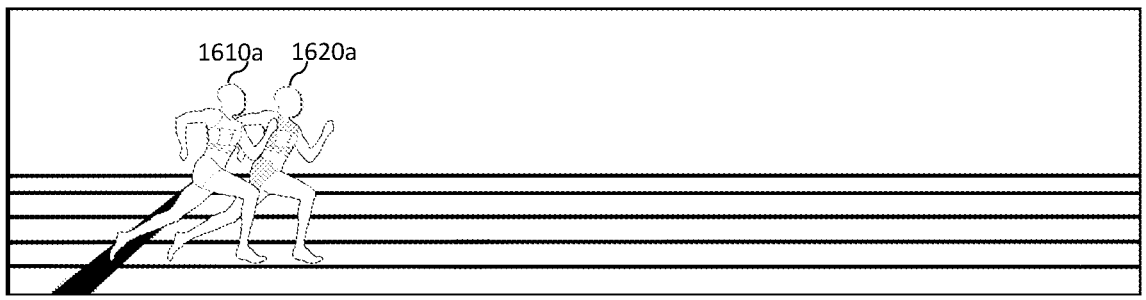
FIGS. 16A and 16B illustrate an example of a synthetic video provided according to various embodiments of the present invention.
Figure 16B:
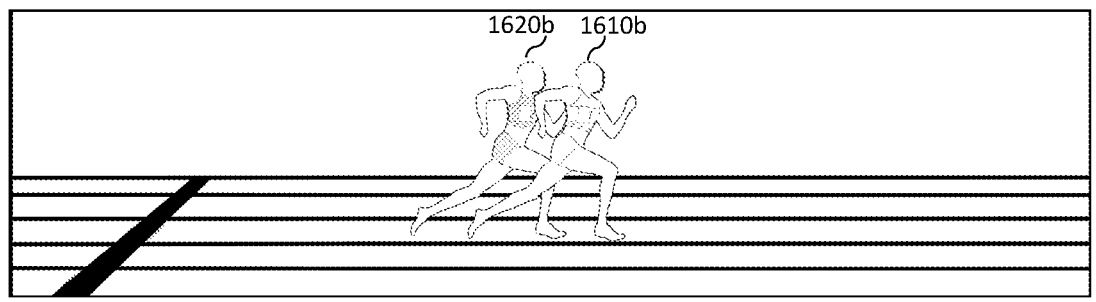

As illustrated in FIG. 16A, a portion of the first athlete video and a portion of the second athlete video may be overlaid, and the overlaid position corresponds to a reproduction of the actual records of the first athlete and the second athlete. As shown in FIG. 16A, the first athlete 1610a lags the second athlete 1620a at the beginning of the race, whereas as shown in FIG. 16B, the first athlete 1610b leads the second athlete 1620b in the middle of the race. Athletes can refer to their pace strategy by comparing their pace with other athletes.

According to various embodiments of the present disclosure, the drone may calculate whether the drone is several meters advanced from the starting line in the advancing direction of the athlete in the straight line main path, based on the recognition of the starting line of the track and the recognition of the starting line from the video data, and based on its own flight speed and flight direction while the athlete flies along the athlete after the athlete starts exercising. In addition, the drone may calculate how many meters the athlete has advanced from the starting line based on a distance that the drone has advanced from the starting line, a distance between the user and the drone, and an angle formed by a direction from the athlete to the drone based on the front direction of the athlete, and store the calculated result as the athlete record. The drone may further include a light source and a light source control device capable of irradiating light in a specific direction, and the light source may be controlled such that, while the second athlete is flying along the second athlete while the second athlete is exercising, the athlete record of the second athlete is checked and at the same time, light is irradiated to a position corresponding to the athlete record of the first athlete, and thus, a position corresponding to the athlete record of the first athlete is mainly displayed on the second athlete.

According to various embodiments of the present invention, a method for obtaining an exercise video performed in a system for obtaining an exercise video, which includes a user device, a server, and a drone, comprises the steps of: receiving, from a user, a first value for specifying a flight height of the drone, a second value for specifying a distance between a first sensor of the drone and a first point on a surface of a first athlete, and a third value for specifying an angular displacement of the drone in a direction from the first point toward the first sensor with respect to a front direction of the first athlete, wherein the first point is a point on the surface of the first athlete at which the distance from the drone is shortest, the third value is equal to or greater than 0 degree and less than 360 degrees, and the first sensor includes a first distance sensor and a camera; transmitting, by the user device, the first value, the second value, and the third value to the server and the drone; confirming information that the drone is at the same height as the first value; obtaining, as at least one collection data, video data obtained by a measurement value of at least one sensor of the drone and a camera included in the first sensor, wherein The method may further include: outputting a predetermined sound through a speaker by the drone in response to a position setting completion signal, and obtaining the at least one collection data while flying in a front direction of the first athlete while the first athlete is exercising; analyzing the at least one collection data to derive at least one command data for positioning the drone at a position corresponding to the first value, the second value, and the third value with respect to the first athlete while the first athlete is exercising; and extracting a portion corresponding to a time when the drone flies at a position corresponding to the first value, the second value, and the third value from video data included in the at least one collection data, based on the at least one collection data, and storing the extracted portion as an exercise video.

According to various embodiments of the present disclosure, the method may include storing a human body image database including a plurality of human body images captured at a plurality of predetermined preset angles, each of the plurality of human body images having values of 0° or more and less than 360°; extracting joint point information from each of the plurality of human body images included in the human body image database; generating a first artificial intelligence model by learning an angle at which the plurality of human body images are captured and joint point information extracted from the plurality of human body images; deriving command data for causing the drone to rotate about a rotation axis perpendicular to the ground in place until the first athlete is located at the center of a video corresponding to the video data; transmitting command data for causing the drone to move in a direction opposite to a first direction in which the first distance sensor faces to the user device if a measurement value of the distance sensor included in the first sensor is smaller than a second value until the measurement value of the first distance sensor corresponds to the second value, and deriving command data for causing the drone to move in the first direction if the measurement value of the distance sensor included in the first sensor is larger than the second value; and identifying a first angle, which is the smallest value among the plurality of preset angles and has the largest value among the plurality of preset angles, as the measurement value of the first distance sensor corresponds to the second value if the measurement value of the first distance sensor is identified to be the second value. The control method may further include deriving an angle increase command to increase angular displacement in a direction from the first point toward the drone as command data, wherein the angle increase command includes a command to move the drone by a preset first distance in a direction perpendicular to the first direction, a command to allow the drone to rotate on a plane parallel to the ground in place until the first athlete is located at the center of the video corresponding to the video data, and a command to move the drone in the first direction until a measurement value of the first distance sensor corresponds to the second value, and deriving the angle increase command as the command data until an angle value indicated by the IMU sensor becomes a value obtained by subtracting the first angle from the third value.

According to various embodiments of the present invention, the method may further comprise the steps of: confirming that an unidentified object approaches the drone on the basis of the at least one collected data during the exercise of the first athlete; confirming whether an object exists on a second direction, which is a direction in which the unidentified object approaches the drone, and on the top of the drone on the basis of confirming that the unidentified object approaches the drone; deriving, from the first sensor, command data for rapidly raising the drone to a height equal to or higher than a predetermined first altitude when a difference between a direction toward the first point and the second direction is equal to or smaller than a predetermined second angle, and if it is confirmed that the object does not exist on the top of the drone; deriving, from the first sensor, command data for blocking motor operation of the drone when a difference between the direction toward the first point and the second direction is equal to or smaller than a predetermined second angle, and if it is confirmed that the object exists on the top of the drone; and deriving, when the difference between the second direction and the first direction is greater than the predetermined second angle, command data for hovering the drone.

According to various embodiments of the present disclosure, the method may further include: deriving command data to maintain a motor rotation speed, a tilt angle, and a progress direction of the drone for a predetermined first time when a specific proportion of a region whose brightness is equal to or less than a predetermined first brightness in a video corresponding to video data is equal to or greater than a predetermined specific proportion while the first athlete is exercising; and stopping the deriving of the command data and transmitting a message to switch the drone to a manual mode to the user device when a state in which a specific proportion of a region whose brightness is equal to or less than the predetermined first brightness in the video corresponding to the video data is equal to or greater than the predetermined specific proportion is continued for a predetermined second time or more.

According to various embodiments of the present disclosure, the method may further include: storing an average color value of a video of a stationary first athlete and an average color value of a bottom of the stationary first athlete before generating an initial position setting completion signal; when it is identified that there is a second athlete different from the first athlete in a video corresponding to the video data, identifying an average color value of a video of the second athlete and an average color value of the bottom of the video of the second athlete; when a difference between the average color value of top of the second athlete and the average color value of top of the first athlete is equal to or less than a preset fourth value, or when a difference between the average color value of the bottom of the second athlete and the average color value of the bottom of the first athlete is equal to or less than a preset fifth value, identifying a moving direction of the second athlete and a moving direction of the first athlete; and when the second athlete moves in the same direction as an average moving direction for a second time of the drone and the first athlete moves in a direction different from the moving direction of the drone for the second time of the drone, deriving at least one command data for positioning the A method for providing exercise data, according to various embodiments of the present invention, comprises the steps of: deriving at least one command data for allowing a drone to rotate around a stationary first athlete; acquiring at least one first collection data including a measurement value of at least one sensor included in the drone and video data obtained by a camera included in the drone while the drone rotates around the stationary first athlete; generating a three-dimensional human body model of the first athlete on the basis of the at least one first collection data; receiving, from the user device, a first value specifying a flight height of the drone, a second value specifying a distance between a first sensor of the drone and a first point on a surface of a first athlete, and a third value specifying an angular displacement of a direction from the first point toward the first sensor of the drone with respect to a front direction of the first athlete; transmitting the first value, the second value, and the third value to the server and the drone, wherein the first point is a point having a shortest distance from the drone on the surface of the first athlete, the third value has a value greater than or equal to 0 degree and less than 360 degrees, and the first sensor includes a first distance sensor and the camera; and acquiring, by the at least one first athlete, at least one exercise data including the measurement value of the at least one sensor and the video data obtained by the camera while the drone is in the direction of the first athlete while the first exercise. The method may include deriving at least one command data for positioning the drone at positions corresponding to a first value, a second value, and a third value; extracting a portion corresponding to time when the drone flies at the positions corresponding to the first value, the second value, and the third value from video data included in the at least one second collection data, based on the at least one second collection data, and storing the extracted portion as an exercise video; extracting a joint point from the exercise video; checking a joint motion range of the first athlete, a joint motion speed, and exercise data indicating a change in the joint motion range and a change in the joint motion speed by period in a periodically repeated motion, based on the joint point extracted from the exercise video and a 3D human body model of the first athlete; and displaying the exercise data on the user device.

According to various embodiments of the present disclosure, the method may further include generating a synthetic video by overlaying the exercise data on the exercise video and transmitting the generated synthetic video to a user device, and the displaying of the exercise data on the user device may include displaying the synthetic video.

According to various embodiments of the present disclosure, the method may further include: storing a human body image database including a plurality of human body images captured at a plurality of predetermined preset angles, each of which has a value of 0° or more and less than 360°; extracting joint point information from each of the plurality of human body images included in the human body image database; and generating a first artificial intelligence model by learning an angle at which the plurality of human body images are captured and joint point information extracted from the plurality of human body images.

According to various embodiments of the present disclosure, deriving at least one command data for causing the drone to rotate around a stationary first athlete may include deriving command data for causing the drone to rotate around a rotation axis perpendicular to the ground in place until the first athlete is located at the center of a video corresponding to the video data; deriving command data for causing the drone to move in a direction opposite to a first direction in which the first distance sensor faces when a measurement value of the distance sensor included in the first sensor is smaller than the first distance until the measurement value of the first distance sensor corresponds to a preset first distance, and deriving command data for causing the drone to move in the first direction when the measurement value of the distance sensor included in the first sensor is larger than the first distance, until the first athlete is identified as being located at the center of the video corresponding to the video data; and deriving an angle increase command for causing the drone to increase an angular displacement of a direction from the first point toward the drone with respect to a front surface of the first athlete until the video data corresponding to the video identified as being captured at a first angle, which is the smallest angle among the plurality of preset angles, is received based on the first artificial intelligence model when the measurement value of the first distance sensor is identified as corresponding to the first distance. The control method may further include: including a command for moving the drone in the first direction until the command is received; deriving the angle increase command as command data until the video data corresponding to the video identified as being captured at a second angle which is the second smallest angle among the plurality of preset angles is received, based on the first artificial intelligence model; and identifying a value obtained by adding an angle value indicated by an IMU sensor included in the drone to the first angle as the angle between the front direction of the first athlete and the direction from the first point toward the first sensor of the drone, until the video data corresponding to the video captured at the second angle is received after the video data corresponding to the video captured at the first angle is received and before the video data corresponding to the video captured at the second angle is received.

According to various embodiments of the present disclosure, the plurality of preset angles may include 0 degrees, 90 degrees, 180 degrees, and 270 degrees.

According to various embodiments of the present invention, a method for providing a synthetic video based on a sports training video comprises the steps of: acquiring a motion video of a first athlete; checking the motion data of the first athlete from the motion video of the first athlete; parsing the motion video of the first athlete for each period of the motion to obtain multiple partial motion videos corresponding to the first athlete; increasing the transparency of a first partial motion video and a second partial motion video among the multiple partial motion videos corresponding to the first athlete, and overlaying the second partial motion video having the increased transparency, the motion data corresponding to the first partial motion video, and the motion data corresponding to the second partial motion video to generate a first synthetic video, wherein the motion data includes a joint motion range of the first athlete; transmitting the first synthetic video to a user device; and displaying the first synthetic video on the user device.

According to various embodiments of the present disclosure, the exercise data may further include an outline of the body of the first athlete extracted from the exercise video of the first athlete, and exercise data corresponding to the first partial exercise video and exercise data corresponding to the second partial exercise video may be displayed in different colors in the synthetic video.

According to various embodiments of the present disclosure, the method may further include: acquiring an exercise video of a second athlete; checking exercise data of the second athlete from the exercise video of the second athlete; acquiring a plurality of partial exercise videos corresponding to the second athlete by parsing the exercise video of the second athlete for each exercise operation period; increasing a transparency of a third partial exercise video corresponding to a time point at which the first partial exercise video is captured among the plurality of partial exercise videos corresponding to the second athlete, and generating a second synthetic video by overlaying the first partial exercise video having the increased transparency with the third partial exercise video having the increased transparency, exercise data corresponding to the first partial exercise video, and exercise data corresponding to the third partial exercise video; transmitting the second synthetic video to a user device; and displaying the second synthetic video on the user device. According to various embodiments, the method may further include receiving, at the user device, a first value specifying a flight height of a drone, a second value specifying a distance between a first sensor of the drone and a first point on a surface of a first athlete, and a third value specifying an angular displacement of a direction from the first point toward the first sensor of the drone with respect to a front direction of the first athlete, and transmitting the first value, the second value, and the third value to the server and the drone, wherein the first point is a point having a shortest distance from the drone on the surface of the first athlete, the third value has a value greater than or equal to 0 degree and less than 360 degrees, and the first sensor includes a first distance sensor and a camera; acquiring, by the drone, at least one first collection data including measurement values of at least one sensor included in the drone and video data obtained by the camera while flying in the front direction of the first athlete while the first athlete is exercising; and deriving, by analyzing the at least one first collection data, at least one command data for positioning the drone at a position corresponding to the first value, the second value, and the third value with respect to the first athlete while the first athlete is exercising, wherein the acquiring of a video of the first athlete includes at least one of the first value, the second value, and the third value corresponding to the first video data based on the at least one data A step of extracting a portion corresponding to time and storing it as an exercise video of the first athlete may be included.

According to various embodiments of the present disclosure, the method may further include: before the first athlete starts exercising, deriving at least one instruction data that causes the drone to rotate around the stationary first athlete; while the drone rotates around the stationary first athlete, acquiring second collection data including a measurement value of at least one sensor included in the drone and video data obtained by the camera; and generating a three-dimensional human body model of the first athlete based on the at least one second collection data, wherein the identifying of the joint motion range of the first athlete based on the joint point extracted from the motion video of the first athlete includes identifying the joint motion range of the first athlete based on the joint point extracted from the motion video and the three-dimensional human body model of the first athlete.

According to various embodiments of the present invention, a method for providing a synthetic video based on a sports training video comprises the steps of: obtaining a first exercise video based on first video data captured by a drone flying in a front direction of a first athlete while the first athlete performs the first exercise; obtaining a first background video and a first athlete video by separating a background region and the first athlete region from the first exercise video; generating a background video by synthesizing a plurality of frames of the first background video based on a flight speed of the drone and time information when the first video data is captured; generating a first synthetic video by overlaying at least one frame of the first athlete video on the background video based on the flight speed of the drone and the time information when the first video data is captured; transmitting the first synthetic video to a user device; and displaying the first synthetic video on the user device.

According to various embodiments of the present disclosure, the method may further include: acquiring a second exercise video based on second video data captured by a drone flying in a front direction of the second athlete while the second athlete performs the first exercise; acquiring a second athlete video by separating a background region and a second athlete region from the second exercise video; generating a second synthetic video by overlaying at least one frame of the second athlete video on the first synthetic video based on a flight speed of the drone and time information when the second video data is captured; transmitting the second synthetic video to a user device; and displaying the second synthetic video on the user device.

According to various embodiments of the present disclosure, the generating of the second synthetic video may include: changing transparency or a color of the plurality of frames of the second athlete video; and generating a second synthetic video by overlaying the plurality of frames, the transparency or color of which has been changed, on the first synthetic video.

According to various embodiments of the present invention, the method comprises the steps of: receiving, by the user device, a first value specifying a flight height of a drone, a second value specifying a distance between a first sensor of the drone and a first point on the surface of a first athlete, and a third value specifying an angular displacement in a direction from the first point toward the first sensor of the drone with respect to a front direction of the first athlete, and transmitting the first value, the second value, and the third value to the server and the drone, wherein the first point is a point on the surface of the first athlete at which the distance from the drone is shortest, the third value is equal to or greater than 0 degree and less than 360 degrees, and the first sensor includes a first distance sensor and a camera; acquiring, by the drone, at least one second collection data including a measurement value of at least one sensor included in the drone and second video data obtained by the camera before the first athlete starts the first exercise; analyzing the at least one second collection data to derive at least one instruction data for positioning the drone at a position corresponding to the first value, the second value, and the third value with respect to the first athlete. The method may further include deriving at least one command data for locating the drone at a position corresponding to the first value, the second value, and the third value with respect to the first athlete while the first athlete performs the first exercise, and the obtaining of the first exercise video may include extracting a portion corresponding to a time when the drone flies at a position corresponding to the first value, the second value, and the third value from first video data included in the at least one first collection data, based on the at least one first collection data, and storing the extracted portion as an exercise video of the first athlete.

According to various embodiments of the present disclosure, the method may further include: before the first athlete starts to exercise, storing a human body image database including a plurality of human body images captured at a plurality of predetermined preset angles and each having a value of 0° or more and less than 360'; extracting joint point information from each of the plurality of human body images included in the human body image database; and generating a first artificial intelligence model by learning an angle at which the plurality of human body images are captured and joint point information extracted from the plurality of human body images, wherein the analyzing of the at least one second collection data and deriving at least one command data for locating the drone at a position corresponding to the first value, the second value, and the third value with respect to the first athlete while the first athlete performs the first exercise includes: deriving command data for causing the drone to rotate around a rotation axis perpendicular to the ground in place until the first athlete is located at the center of a video corresponding to the second video data; and deriving command data for causing the drone to move in a direction opposite to a first direction in which the first distance sensor faces when a measurement value of the distance sensor included in the first distance sensor is identified to be located at the center of a video corresponding to the second video data and deriving command data for causing the drone to move in a direction opposite to the first direction in which the first distance sensor faces when the measurement value of the first distance sensor is larger than the measurement value of the second distance sensor included in the first distance sensor is identified to be smaller than the second value. The processor may be configured to identify a first angle smaller than the third value and having a greatest value; derive, as command data, an angle increase command that causes the drone to increase an angular displacement of a vector toward the drone from the first point with respect to the front direction of the first athlete until the second video data corresponding to the video identified as being captured at the first angle is received based on the first artificial intelligence model, wherein the angle increase command includes a command to move the drone by a preset first distance in a direction perpendicular to the first direction, a command to cause the drone to rotate on a plane parallel to the ground in place until the first athlete is located at the center of the video corresponding to the second video data, and a command to move the drone in the first direction until a measurement value of the first distance sensor corresponds to the second value; and derive the angle increase command as command data until an angle value indicated by an IMU sensor included in the drone becomes a value obtained by subtracting the first angle from the third value.

According to an embodiment of the present invention, a system for acquiring an exercise video using a drone can provide a video obtained at a predetermined relative position and angle with respect to a subject by storing, as an exercise video, a video obtained by the drone while a position of the drone is at a predetermined position on a cylinder coordinate based on an athlete which is the subject. In a video obtained in a state in which a relative position and angle of a subject of a camera are not constantly maintained, motion data, which is a value constituting a motion posture, such as a change in an angle of a specific joint of the subject, may not be accurately specified due to a change in a position and a view angle of the subject in the video. On the other hand, the system for acquiring a motion video using a drone according to an embodiment of the present invention may obtain a video by a camera having a predetermined position on a cylinder coordinate based on a subject. Since quantitative data such as a joint angle can be extracted with high accuracy through an analysis of a video obtained in a state in which a position on a cylindrical coordinate based on a subject of a camera is constant, a system for acquiring a motion video using a drone according to an embodiment of the present invention helps to accurately and precisely grasp a wrong posture.

According to an embodiment of the present invention, the method for providing exercise data based on a sports training video obtained by using a drone extracts quantitative data such as a joint angle with high accuracy by analyzing a video obtained in a state where a position on a cylindrical coordinate based on a subject of a camera is constant, thereby helping to accurately and accurately grasp a wrong exercise posture.

A method for providing a synthetic video based on a sports training video according to an embodiment of the present invention provides a video by synthesizing a video obtained in a state in which a position on a cylindrical coordinate based on a subject of a camera is constant. When videos of subjects in a video obtained in a state in which a relative position and angle of a subject of a camera are not constantly maintained are synthesized, motion data, which is a numerical value constituting a motion posture, such as a change in an angle of a specific joint of each subject, cannot be accurately specified even through the synthetic video due to a change in a position and a view angle of the subject in the video, and thus an accurate posture change cannot be determined. On the other hand, the method for providing a synthetic video based on a sports training video according to an embodiment of the present invention provides a video by synthesizing a video obtained in a state in which a position on a cylindrical coordinate based on a subject of a camera is constant, thereby allowing a user to check a posture change at a glance and directly compare the posture change, thereby enabling efficient posture improvement.

Although the embodiments of the present invention have been described above with reference to the accompanying drawings, it will be understood that the skilled person in the art in the technical field to which the present invention pertains may be implemented in other specific forms without changing the technical idea or essential feature. Therefore, it should be understood that the above-described embodiments are exemplary and not restrictive in all aspects.

What is claimed is:

1. A method for providing a synthetic video based on a sports training video performing by a exercise video acquisition system including a server, a user device and a drone, the method comprising:

storing, by the server, a human body image database including a plurality of human body images captured at a plurality of predetermined preset angles having values of 0° or more and less than 360°;

extracting, by the server, joint point information from each of the plurality of human body images included in the human body image database;

generating, by the server, a first artificial intelligence model by learning the angles at which the plurality of human body images are captured and the joint point information extracted from the plurality of human body images;

obtaining, by the drone, at least one second collection data including a measurement value of at least one sensor included in the drone and second video data obtained by a camera included in the drone before a first athlete starts a first exercise;

receiving, by the user device, a first value specifying a flight height of the drone, a second value specifying a distance between a first sensor of the drone and a first point on a surface of the first athlete, and a third value specifying an angular displacement in a direction from the first point toward the first sensor with respect to a front direction of the first athlete;

transmitting, by the user device, the first value, the second value, and the third value to the server and the drone, wherein the first point is a point at which a distance from the drone is shortest on the surface of the first athlete, the third value has a value of 0° or more and less than 360°, and the first sensor includes a first distance sensor and a camera;

deriving, by the server, by analyzing the at least one second collection data in the server, at least one command data for positioning the drone at a position corresponding to the first value, the second value, and the third value with respect to the first athlete;

storing, by the server, based on the at least one second collection data, an average color value of a top and an average color value of a bottom of a stationary first athlete;

obtaining, by the server, at least one first collection data including a measurement value of at least one sensor included in the drone and first video data obtained by the camera while the drone flies to the front direction of the first athlete during the first exercise of the first athlete;

deriving, by the server, at least one command data for positioning the drone at a position corresponding to the first value, the second value, and the third value with respect to the first athlete during the first exercise of the first athlete by analyzing the at least one first collection data in the server;

extracting, by the server, a portion corresponding to a time when the drone flies in a position corresponding to the first value, the second value, and the third value from the first video data and storing the portion as an exercise video of the first athlete;

confirming, by the server, exercise data of the first athlete from the exercise video of the first athlete;

obtaining, by the server, a plurality of partial exercise videos corresponding to the first athlete by parsing the exercise video of the first athlete for each exercise cycle;

increasing, by the server, transparency of a first partial exercise video and a second partial exercise video from among the plurality of partial exercise videos corresponding to the first athlete;

generating, by the server, a first synthetic video by overlaying the second partial exercise video with increased transparency, exercise data corresponding to the first partial exercise video, and exercise data corresponding to the second partial exercise video onto the first partial exercise video with increased transparency, wherein the exercise data includes a joint motion range of the first athlete;

transmitting, by the server, the first synthetic video to a user device; and displaying, by the user device, the first synthetic video;

wherein the deriving of, by analyzing the at least one first collection data in the server, at least one command data for positioning the drone at a position corresponding to the first value, the second value, and the third value with respect to the first athlete during the first exercise of the first athlete comprises:

deriving, by the server, command data for causing the drone to rotate on a rotation axis perpendicular to a ground in place until the first athlete is positioned at the center of a video corresponding to the second video data;

deriving, by the server, command data for causing the drone to move in a direction opposite to a first direction in which the first distance sensor faces when a measurement value of the first distance sensor is smaller than the second value when it is confirmed that the first athlete is positioned at the center of the video corresponding to the second video data;

deriving, by the server, command data for causing the drone to move in the first direction when the measurement value of the first distance sensor is larger than the second value, until the measurement value of the first distance sensor corresponds to the second value;

confirming, by the server, a first angle which is smaller than the third value and has a largest value among a plurality of predetermined angles, when it is confirmed that the measurement value of the first distance sensor corresponds to the second value;

deriving, by the server, as command data, an angle increase command that causes the drone to increase an angular displacement of a vector from the first point toward the drone with respect to the front direction of the first athlete until the second video data corresponding to the image identified as being captured at the first angle based on the first artificial intelligence model is received, wherein the angle increase command includes a command to move the drone by the preset first distance in a direction perpendicular to the first direction, a command to cause the drone to rotate on a plane parallel to the ground in place until the first athlete is located at the center of the video corresponding to the second video data, and a command to move the drone in the first direction until the measurement value of the first distance sensor corresponds to the second value; and deriving, by the server, as command data, the angle increase command until an angle value indicated by an IMU sensor included in the drone becomes a value obtained by subtracting the first angle from the third value, wherein the obtaining of the at least one first collection data comprises:

confirming, based on the first video data, that there is a second athlete different from the first athlete;

confirming an average color value of a top and an average color value of a bottom of the second athlete;

confirming that a difference between the average color value of the top of the second athlete and the average color value of the top of the first athlete is equal to or less than a predetermined fourth value or a difference between the average color value of the bottom of the second athlete and the average color value of the bottom of the first athlete is equal to or less than a preset fifth value;

confirming a moving direction of the second athlete and a moving direction of the first athlete; and changing an object to be tracked by the drone from the first athlete to the second athlete when the first athlete moves in a direction different from an average moving direction of the drone during a predetermined second time and the second athlete moves in a same direction as the average moving direction of the drone during the second time.

2. The method of claim 1, wherein the exercise data further comprises an outline of the human body of the first athlete extracted from the exercise video of the first athlete, and wherein in the synthetic video, the exercise data corresponding to the first partial exercise video and the exercise data corresponding to the second partial exercise video are displayed in different colors.

3. The method of claim 1, further comprising:

obtaining, by the server, an exercise video of the second athlete;

confirming, by the server, exercise data of the second athlete from the exercise video of the second athlete;

obtaining, by the server, a plurality of partial exercise videos corresponding to the second athlete by parsing the exercise video of the second athlete for each exercise cycle;

increasing, by the server, transparency of a third partial exercise video corresponding to a time point at which the first partial exercise video is captured among the plurality of partial exercise videos corresponding to the second athlete;

generating, by the server, a second synthetic video by overlaying the third partial exercise video with increased transparency, the exercise data corresponding to the first partial exercise video, and exercise data corresponding to the third partial exercise video;

transmitting, by the server, the second synthetic video to the user device; and displaying, by the user device, the second synthetic video.

4. The method of claim 1, further comprising:

storing, by the server, an exception handling color;

maintaining, by the server, an object to be tracked by the drone as the first athlete without confirming the moving direction of the second athlete and the moving direction of the first athlete, when a difference between the average color value of the bottom of the second athlete and the exception handling color is equal to or less than the preset fifth value, and when a difference between the average color value of the bottom of the first athlete and the exception handling color is equal to or less than the preset fifth value although a difference between the average color value of the bottom of the second athlete and the average color value of the bottom of the first athlete is equal to or less than the preset fifth value; and maintaining, by the server, an object to be tracked by the drone as the first athlete without confirming the moving direction of the second athlete and the moving direction of the first athlete although a difference between the average color value of the top of the second athlete and the average color value of the top of the first athlete is equal to or less than the preset fifth value, when a difference between the average color value of the top of the second athlete and the exception handling color is equal to or less than the preset fifth value, and when a difference between the average color value of the top of the first athlete and the exception handling color is equal to or less than the preset fifth value.

5. The method of claim 4, wherein the storing of the exception handling color comprises:

obtaining, by the server, a search result corresponding to a predetermined keyword indicating an exercise among posts on social media;

recognizing, by the server, a human form in the search result;

extracting, by the server, a color of a top and a color of a bottom and storing the extracted color as a database, based on the recognition of the human form in the search result; and storing, by the server, a color having an appearance frequency of a predetermined frequency or more in the database as the exception handling color.

* * * * *